United States Patent
Schenk et al.

(10) Patent No.: US 11,258,804 B2
(45) Date of Patent: Feb. 22, 2022

(54) METHOD AND SYSTEM FOR CONTROLLING ACCESS FOR A USER EQUIPMENT TO A LOCAL DEVICE

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Michael Schenk, The Hague (NL); Antonius Norp, The Hague (NL); Sander de Kievit, Leiden (NL); José Almodóvar Chico, Delft (NL); Gerrit Schilt, The Hague (NL)

(73) Assignees: Koninklijke KPN N.V., Rotterdam (NL); Nederlandse Organisatie Voor Toegepast-Natuurwetenschappelijk Onderzoek TNG, 'S-Gravenhage (NL)

( * ) Notice: Subject to any disclaimer, the term of this patent is extended or adjusted under 35 U.S.C. 154(b) by 0 days.

(21) Appl. No.: 16/065,116

(22) PCT Filed: Dec. 23, 2016

(86) PCT No.: PCT/EP2016/082563
§ 371 (c)(1),
(2) Date: Jun. 21, 2018

(87) PCT Pub. No.: WO2017/114788
PCT Pub. Date: Jul. 6, 2017

(65) Prior Publication Data
US 2019/0007417 A1    Jan. 3, 2019

(30) Foreign Application Priority Data
Dec. 28, 2015 (EP) .................................. 15202800.7

(51) Int. Cl.
*H04L 29/06* (2006.01)
*H04W 12/08* (2021.01)
(Continued)

(52) U.S. Cl.
CPC ............. *H04L 63/107* (2013.01); *H04W 4/02* (2013.01); *H04W 4/025* (2013.01); *H04W 12/08* (2013.01);
(Continued)

(58) Field of Classification Search
CPC ..... H04W 48/04; H04W 12/08; H04W 4/025; H04W 4/02; H04W 12/12; H04W 88/16; H04W 92/18; H04L 63/107
See application file for complete search history.

(56) References Cited

U.S. PATENT DOCUMENTS

| 6,292,833 B1 * | 9/2001 | Liao ...................... H04W 12/08 709/229 |
| 2002/0164997 A1 | 11/2002 | Parry |

(Continued)

FOREIGN PATENT DOCUMENTS

| CN | 102984039 A | 3/2013 |
| CN | 104133459 A | 11/2014 |

(Continued)

OTHER PUBLICATIONS

European Patent Office, Extended European Search Report for EP Pat. App. No. 15197013.4, dated May 30, 2016.
(Continued)

*Primary Examiner* — John A Follansbee
*Assistant Examiner* — Fadi Haj Said
(74) *Attorney, Agent, or Firm* — McDonnell Boehnen Hulbert & Berghoff LLP

(57) ABSTRACT

The invention relates to a method for controlling access for a user equipment to at least one local device via an inter-
(Continued)

mediary system that is configured to connect to a local network and to a public network. The user equipment is connected to the public network and the at least one local device is connected to the local network. The method comprises a number of steps in the intermediary system. One of these steps is storing one or more location conditions for access for the user equipment to the at least one local device. Another step is receiving first location information of the user equipment over the public network, the first location information indicating a location of the user equipment. Yet another step is controlling access for the user equipment to the at least one local device by verifying whether the first location information satisfies the one or more location conditions. The invention further relates to the intermediary system used in the method.

13 Claims, 17 Drawing Sheets

(51) Int. Cl.
  *H04W 48/04* (2009.01)
  *H04W 4/02* (2018.01)
  *H04W 92/18* (2009.01)
  *H04W 88/16* (2009.01)
  *H04W 12/63* (2021.01)

(52) U.S. Cl.
  CPC .......... *H04W 48/04* (2013.01); *H04W 12/63* (2021.01); *H04W 88/16* (2013.01); *H04W 92/18* (2013.01)

(56) References Cited

U.S. PATENT DOCUMENTS

| | | | | |
|---|---|---|---|---|
| 2004/0025047 | A1* | 2/2004 | Mayne | H04L 69/08 726/7 |
| 2005/0101245 | A1* | 5/2005 | Ahmavaara | H04M 15/50 455/1 |
| 2010/0189064 | A1 | 7/2010 | Raveendran | |
| 2010/0293590 | A1* | 11/2010 | Dandabany | H04L 63/108 726/1 |
| 2012/0147825 | A1 | 6/2012 | Hassan et al. | |
| 2012/0265913 | A1 | 10/2012 | Suumaki et al. | |
| 2013/0312066 | A1 | 11/2013 | Suarez et al. | |
| 2014/0005809 | A1 | 1/2014 | Frei et al. | |
| 2014/0177472 | A1 | 6/2014 | Halasz et al. | |
| 2014/0195654 | A1 | 7/2014 | Kiukkonen et al. | |
| 2015/0054947 | A1 | 2/2015 | Dawes | |
| 2015/0365787 | A1* | 12/2015 | Farrell | H04W 4/08 455/456.1 |

FOREIGN PATENT DOCUMENTS

| | | |
|---|---|---|
| EP | 3225071 A1 | 10/2017 |
| WO | 2005/110208 A1 | 11/2005 |
| WO | 2008/108699 A1 | 9/2008 |
| WO | 2009/055716 A1 | 4/2009 |
| WO | 2010/127365 A1 | 11/2010 |
| WO | 2010/141714 A2 | 12/2010 |
| WO | 2010/141714 A3 | 12/2010 |
| WO | 2011/053008 A2 | 5/2011 |
| WO | 2011/062341 A1 | 5/2011 |
| WO | 2014/187601 A1 | 11/2014 |
| WO | 2016/083580 A1 | 6/2016 |
| WO | 2017/093223 A1 | 6/2017 |
| WO | 2017/114773 A1 | 7/2017 |

OTHER PUBLICATIONS

European Patent Office, Extended European Search Report for EP Pat. App. No. 15202800.7, dated June 8, 2016.
European Patent Office, Extended European Search Report for EP Pat. App. No. 15202824.7, dated Jun. 17, 2016.
International Searching Authority, International Search Report and Written Opinion for PCT Pat. App. No. PCT/EP2016/079083, dated Jan. 10, 2017.
International Searching Authority, International Search Report and Written Opinion for PCT Pat. App. No. PCT/EP2016/082563, dated Mar. 22, 2017.
International Searching Authority, International Search Report and Written Opinion for PCT Pat. App. No. PCT/EP2016/082528, dated Apr. 3, 2017.
M. Schenk et al., Method afor Device-to-Device Communication Between a Local Device and a Remote Device,U.S. Appl. No. 15/779,331, May 25, 2018.
M. Schenk et al., Establishment of a Connection Between Two Local Devices Connected to Different Networks, U.S. Appl. No. 16/065,760, dated Jun. 22, 2018.
Third Generation Partnership Project, 3GPP TS 23.402 V13.3.0 Technical specfication group services and system aspects; Architectural enhancements for non-3GPP accesses (Release 13), Sep. 17, 2015.
Third Generation Partnership Project, 3GPP TS 23.703 V1.1.0 "Technical specfication group services and system aspects; Study on architecture enhancement to support Proximity-based Service (ProSe) (Release 12)", Jan. 28, 2014.
Office Action in Chinese Application 201680082777.4 dated Aug. 5, 2020.

\* cited by examiner

METHOD AND SYSTEM FOR CONTROLLING ACCESS FOR A USER EQUIPMENT TO A LOCAL DEVICE

CROSS REFERENCE TO RELATED APPLICATIONS

This application is a national stage entry of, and claims priority to, PCT Pat. App. No. PCT/EP2016/082563, filed Dec. 23, 2016, which claims priority to European Pat. App. No. 15202800.7, filed Dec. 28, 2015, all of which are fully incorporated herein by reference for all purposes.

FIELD OF THE INVENTION

The invention relates to a method for controlling access for a user equipment to at least one local device via an intermediary system that is configured to connect to a local network and to a public network, wherein the user equipment is connected to the public network and the at least one local device is connected to the local network. The invention further relates to the intermediary system of the method.

BACKGROUND OF THE INVENTION

The amount of devices that is able to connect to the Internet of Things is expected to grow enormously. It is estimated that by the year 2020 50 billion devices will be connected. Therefore, it is no surprise that industry efforts and investments are directed towards this field. The new generation of mobile systems, 5G, is expected to bring new network and services capabilities. One aspect of the new capabilities relates to device-to-device (D2D) communication.

Methods are known for connecting a user equipment to a local device that is connected to a local network, e.g. a WiFi network at home. A simple method of controlling access to the local device comprises protecting the local network with a password. Access for the user equipment to the local device may then be granted by providing the password to an owner of the user equipment with which the user equipment can connect to the local network. Once connected to the local network, the user equipment may connect to the local device. One of the drawbacks of this method is that once the password has been provided, the user equipment may always connect to the local network and thus to the local device. Denying access to the user equipment may require changing the password of the local network, which may be cumbersome.

In an earlier application of the applicants EP 15197013.4 a method is described that enables a user equipment to access a local device connected to a local network, even if the user equipment is not connected directly to the local network, but is connected to a public network. This method enables that local devices may potentially be controlled from every mobile phone in the world. Therefore, managing permissions to access a local device may become very laborious for an owner of the local device.

SUMMARY

It is an object of the present invention to provide an improved method for managing the access to and control of a local device.

Therefore one aspect of the invention relates to a method for controlling access for a user equipment to at least one local device via an intermediary system that is configured to connect to a local network and to a public network. The user equipment is connected to the public network and the at least one local device is connected to the local network. The method comprises a number of steps in the intermediary system. One of these steps is storing one or more location conditions for access for the user equipment to the at least one local device. Another step is receiving first location information of the user equipment over the public network, the first location information indicating a location of the user equipment. Yet another step is controlling access for the user equipment to the at least one local device by verifying whether the first location information satisfies the one or more location conditions.

Another aspect of the invention relates to an intermediary system for controlling access for a user equipment to at least one local device via the intermediary system. The user equipment is connected to a public network and the at least one local device is connected to a local network. The intermediary system comprises storage means configured to store one or more location conditions for access for the user equipment to the at least one local device. The intermediary system further comprises a connection device that is configured to connect to the local network and to the public network and configured to receive first location information of the user equipment over the public network, the first location information indicating a location of the user equipment. The intermediary system further comprises an access control device configured to control access for the user equipment to the at least one local device by verifying whether the first location information satisfies the one or more location conditions.

The applicants have recognized that the location of the user equipment may be an important parameter in determining whether a user equipment should have access to a local device. Furthermore, the applicants have realized that recent developments, such as the developments in 3GPP standardization, will bring improved methods to determine the location of a user equipment.

The importance of the location of the user equipment is reflected in the disclosed method in that the access control is in dependence of whether the one or more location conditions are satisfied on the basis of the first location information. Hence, depending on the location of the user equipment, access for the user equipment to the local device is controlled. Thus, the owner of the local device is provided with more flexibility in managing permissions. For example, the owner can restrict the access to people that are within a certain room or building.

The local network may comprise a local area network comprising wired Ethernet connections and/or wireless connections with devices, for example over WIFI, Bluetooth or ZigBee. This includes so-called ad hoc modes or peer-to-peer connections without a network infrastructure in between. Access to the local network is typically restricted by the owner of the network. The assumption in current solutions is that the owner of devices that are connected to the local network is either the same person as the local network owner or has an established relationship (e.g. member of same household or employer/employee).

The public network may comprise a network of a Mobile Network Operator (MNO).

The intermediary system and/or the user equipment may be connected to a base station of the public network, such as a(n) (e)NodeB. It should be appreciated that this base station may be a base station in the local network. This type of base station is called a home eNodeB or femtocell. The home eNodeB is normally used to improve indoor coverage of the public network and the user equipment and/or the intermediary system can connect to the public network by connecting to the home eNodeB. Connecting to the public network may also comprise using the 3GPP Generic Bootstrapping Architecture (GBA) or other 3GPP standardized technologies (ref 3GPP TS 23.402) that allow the use of other radio technologies, such as WiFi or other wired network. These technologies may comprise connecting via a secure tunnel to the public network using any kind of radio technology or wired technology. To the public network, the intermediary system may behave as if connected using the regular 3G/4G/5G radio network.

The intermediary system may have a formal identity in the public network. The intermediary system may e.g. comprise one or more of an International Mobile Equipment Identity (IMEI), an International Mobile Subscriber Identity (IMSI) or an MSISDN. The intermediary system may comprise a Subscriber Identity Module, (SIM), UMTS Subscriber Identity Module (USIM) or IMS Subscriber Identity Module (ISIM). The intermediary system may also comprise a secure storage space for identity credentials, such as the Universal Integrated Circuit Card (UICC). The public network interface may comprise a 3G/4G/5G radio interface. It should be appreciated that at least a part of the intermediary system may be virtualized. For example, the access control device may be virtualized in the public network.

The intermediary system may be configured to set up a secure connection with the user equipment. The secure connection may be an encrypted tunnel. Alternatively, the intermediary system may be directly addressable over the public network by its IP address. Another way how the intermediary system can connect with the user equipment may be setting up an IP connection as per EP14195052.7. Yet another way to send information between the user equipment and the intermediary system is to make use of a service provided by the public network that will route information between the user equipment and intermediary system based on the fact that both the user equipment and the intermediary system are known in the public network (like a femtocell and a user equipment are presently known to the public network) and that the public network can route traffic between any two endpoints known in the public network and even between two endpoints known in associated public networks, such as roaming phones. Routing can further comprise setting up a tunnel between the two endpoints.

The one or more location conditions may comprise a condition that the user equipment is in a specific geographical region. It may also be that the location conditions comprise a condition that the user equipment is in a specific room or floor within a building. The at least one local device may be associated with an owner who may determine the location conditions. The location conditions may be received from a further user equipment, for example from a user equipment associated with the owner. The owner may also program the location conditions associated with his at least one local device into the intermediary system.

It should be appreciated that first location information may comprise geographical coordinates. The first location information may also comprise a specific room or floor in a building. The first location information may be determined by the user equipment, for example by the user equipment determining its GPS coordinates. The first location information may also be determined with network-based localization techniques utilizing the public network's infrastructure. Examples of such network-based techniques are cell identification, triangulation and "Forward Link" timing methods. The first location information may also be determined using SIM based localization techniques, WiFi localization techniques, hybrid positioning systems, or any other localization technique that may determine the location of the user equipment.

Home eNodeBs described above generally speaking have a limited power and therefore a limited reach. Outside that reach, user equipment cannot connect to the home eNodeB. In case the user equipment is connected to a home eNodeB, the public network may infer first location information from the fact that the user equipment is in reach of the home eNodeB. The public network may be able to determine the first location information, because the user equipment is connected to the public network through the home eNodeB, or because the home eNodeB shows up in measurement reports of base stations close by the user equipment. The address and/or location of the home eNodeB may also be registered in the public network. Said differently, the public network could infer the first location information, e.g. a distance between the eNodeB and the user equipment, whenever the user equipment moves within reach of the home eNodeB.

The intermediary system and/or the connection device and/or the access control device may be integrated with a home eNodeB as described above. It should be appreciated that the first location information may comprise a distance between the intermediary system and the user equipment, wherein the distance may have been determined in the public network. It should be appreciated that the first location information may comprise a proximity notification indicating that the user equipment is in the proximity of the intermediary system. The proximity notification may be associated with the 3GPP Proximity Service currently under development. It should be understood that the one or more location conditions may comprise a condition that the user equipment is in the proximity of the intermediary system.

It should be noted that controlling access for the user equipment to the local device may comprise providing access and/or denying access for the user equipment to the local device.

It should be appreciated that considerations in this disclosure regarding features of methods performed in the intermediary system, also apply to the corresponding features of the intermediary system.

In one embodiment the one or more location conditions comprise a proximity condition relating to the intermediary system. The method further comprises a number of steps. One step is storing second location information indicating a location of the intermediary system. Another step is determining a distance between the intermediary system and the user equipment based on the first and second location information. Yet another step is controlling access for the user equipment to the at least one local device by verifying whether the determined distance satisfies the proximity condition.

The proximity condition may comprise a condition that the user equipment is within a certain distance from the intermediary system. The second location information may comprise geographical coordinates. The second location information may also comprise a specific room or floor in a building. It should be appreciated that the second location information may be obtained by a user programming the location of the intermediary system into the intermediary system. Since the intermediary system is configured to connect to the public network, the location of the intermediary system may be obtained using any network-based localization techniques that may be used to determine the first location information as described above. The location of the intermediary system may also be obtained by the intermediary system determining its GPS coordinates. Another way to obtain the location of the intermediary system involves determining the location of the intermediary system based on an IP address of the intermediary system. It should be appreciated that the location of the intermediary system may be used as an approximation for the location of the at least one local device. In case the intermediary system is connected to a home eNodeB as described above, the public network may infer the second location information from the fact that the intermediary system is in reach of the home eNodeB, similar to how the first location information may be inferred from the fact that the user equipment is in reach of the home eNodeB, as described above. The embodiment is advantageous in that it allows both the location of the user equipment and the location of the intermediary system to be taken into account. More specifically, the embodiment allows the distance between them to be taken into account. In an example the at least one local device is a television and the proximity condition for a specific user equipment is that this user equipment should be within 5 meters of the intermediary system that is connected to the same local network as the television. As a consequence the television may only be controlled from this user equipment if the user equipment is within 5 meters of the intermediary system. It should be noted that this embodiment does not require the use of a 3GPP Proximity Service as described above. Hence, the proximity condition may also relate to (long) distances which are typically not associated with the 3GPP Proximity Service.

In one embodiment the at least one local device comprises a first local device and a second local device. The method comprises the steps of controlling access for the user equipment to the first local device by verifying whether the first location information satisfies the first location condition and controlling access for the user equipment to the second local device by verifying whether the first location information satisfies the second location condition. The first location condition may be different from the second location condition. This embodiment enables that an owner can determine a separate location condition for each of his local devices.

A first device identifier may be associated with the first local device and a second device identifier may be associated with the second local device. The device identifiers may be stored in the intermediary system. The device identifiers may be used to associate devices with location conditions.

In one embodiment, the method comprises or the intermediary system is further configured for, after providing access for the user equipment to the at least one local device, transmitting profile information for the user equipment enabling the user equipment to present a virtual representation of the at least one local device in the local network. The profile information may be transmitted over the secure connection between the intermediary system and the user equipment in the public network and may comprise one or more device identifiers for the at least one local device.

It should be appreciated that the profile information may be transmitted to the user equipment via the public network. It should be appreciated that the profile information may also be transmitted to a registry in the public network. The registry may cache the profile information and may transmit the profile information to the user equipment.

It should be appreciated that the virtual representation on the user equipment may be such that to the user of the user equipment and/or to applications running on the user equipment, the user equipment appears to be directly connected to the local network. The virtual representation may be obtained by an application installed and executed on the user equipment. The virtual representation may also be obtained by creating a network overlay in the public network specific to that UE.

This embodiment is advantageous, because it enables a user of the user equipment or an application running on the user equipment to perceive the user equipment as if the user equipment is directly connected to the at least one local device via the local network, e.g. as if the user equipment is connected over an ad hoc network, such as a Bluetooth, WiFi ad hoc or infrared network.

In one embodiment, the method comprises receiving via the public network from the user equipment a control signal for the at least one local device. The method further comprises after providing access for the user equipment to the at least one local device, transmitting via the local network the control signal to the at least one local device.

This embodiment may also comprise storing an address of the at least one local device in the local network. The address associated with the local device may comprise an IP-address or another local address, such as a MAC-address, of the local device in the local network. The address may be stored in storage means of the intermediary system.

The control signal may be received over a connection between the intermediary system and the user equipment. The connection may be a secure connection or may comprise an IP connection as per EP14195052.7 or may be facilitated by the MNO, meaning that the intermediary system and the user equipment are known to the public network and that the public network will route the traffic from one to another as a service. The control signal may comprise an identifier and/or an address of the local device that enables the intermediary system to route the control signal to the local device. The control signal may be sent using a protocol of the local device. The received control signal may be transmitted transparently from the user equipment via the intermediary system to the local device. It should be appreciated that the control signal may be received indirectly from the user equipment, for example via a D2D registry in the public network.

The embodiment enables that a user may actually control a device in the local network, for example a device in his home, while the user equipment is not connected to the local network, but is connected to the public network.

In one embodiment the method comprises storing one or more further location conditions for access for the user equipment to the at least one local device, the one or more further location conditions relating to a further user equipment. The method further comprises receiving third location information indicating a location of the further user equipment; and controlling access for the user equipment to the at least one local device by verifying whether the third location information satisfies the one or more further location conditions.

The further user equipment may belong to an owner of the at least one local device and/or intermediary system. It should be appreciated that the third location information may be determined with the same techniques that may be used for determining the first location information described above. The embodiment allows the location of a further user equipment to be taken into account. In an example, the local device is a television, the user equipment is a mobile phone of a child, the further user equipment is the mobile phone of a parent. The parent may determine the further location condition that access for the mobile phone of the child to the television may only be provided if the mobile phone of the parent is in the house.

In one embodiment the method comprises a number of steps. One of these steps is receiving at least one of updated first location information, updated second location information and updated third location information. Another step is denying access for the user equipment to the at least one local device in dependence of at least one of:

the one or more location conditions no longer being satisfied on the basis of the updated first location information; and
  the proximity condition no longer being satisfied on the basis of an updated distance, the updated distance being determined based on at least one of the updated first location information and the updated second location information; and
  the one or more further location conditions no longer being satisfied on the basis of the updated third location information.

This embodiment allows for continuously checking whether the user equipment should have access to the at least one local device and denying access when the user equipment is no longer allowed to access the local device.

In one embodiment the method comprises after denying access for the user equipment to the at least one local device, at least one of:

transmitting an instruction for the user equipment to disable display of a virtual representation of the at least one local device in the local network; and
  transmitting an update for the user equipment enabling the user equipment to display an updated virtual representation of the at least one local device in the local network. The updated virtual representation comprises an indication that access for the user equipment to the at least one local device has been denied. This embodiment enables that only virtual representations are presented at the user equipment for which access has been provided. Also, this embodiment enables that virtual representations of local devices that the user equipment does not have access to are not displayed, removed or visibly disabled, so a user of the user equipment only sees representations of local devices the user can get access to. This provides a shorter, more convenient list of available local devices to the user. For example, local devices at locations far away from the user are probably less interesting to the user and the corresponding virtual representations can be automatically disabled on the user equipment. The same applies to a user application on the user equipment. The user application does not have to access local devices by trial and error, but can be provided with a list (may be also zero or one) of virtual representations of local devices that that are in principle accessible.

In one embodiment the method comprises storing one or more access conditions for access for the user equipment to the at least one local device. The one or more access conditions relate to at least one of:

a list of identifiers associated with a plurality of user equipments, the list being stored in the intermediary system, and a point in time or time period. The method further comprises controlling access for the user equipment to the at least one local device in dependence of whether the one or more access conditions are satisfied.

It should be appreciated that the list of identifiers may be stored in the intermediary system. An access condition relating to the list of identifiers may specify that access for a user equipment may only be provided if the list of identifiers comprises an identifier of the user equipment. The list of identifiers may be based on an address book of a user equipment, or on a contact list associated with an over-the-top service, such as Facebook.

An access condition relating to a point in time may comprise a condition that after or before a specific point of time a user equipment may access a local device. An access condition relating to a time period may comprise a condition that a user equipment may only access a local device during a certain time period. The embodiment provides greater flexibility in managing access to the at least one local device.

In one embodiment of the method the intermediary system comprises a connection device configured to connect to the local network and to the public network, and an access control device that is configured for controlling access for the user equipment to the at least one local device according to one or more of the preceding claims, wherein at least the access control device is implemented in at least one of: the at least one local device, the user equipment and the public network. The access control device may for example comprise a femtocell and/or a WiFi access point. This embodiment allows the functionality of the method to be distributed among different locations.

In one embodiment of the intermediary system at least the access control device is implemented in at least one of the at least one local device, the user equipment and the public network. This embodiment allows the functionality of the intermediary system to be distributed among different locations.

Another aspect of the disclosure relates to a method for controlling access for a user equipment to at least one local device via an intermediary system that is configured to connect to a local network and to a public network. The user equipment is connected to the public network and the at least one local device is connected to the local network. The method comprises a number of steps in the intermediary system. One of these steps is storing one or more location conditions for access for the user equipment to the at least one local device, the one or more location conditions relating to a master user equipment. Another step is receiving over the public network location information indicating a location of the master user equipment. Yet another step is controlling access for the user equipment to the at least one local device by verifying whether the location information satisfies the one or more location conditions. This method allows that access for the user equipment may be controlled in dependence of the location of the master equipment only. The location of the user equipment may not be relevant. It should be appreciated that the master user equipment may be connected to the public network. The master user equipment may belong to an owner of the at least one local device and/or intermediary system. The embodiments discussed above are also applicable to this aspect of the disclosure.

Yet another aspect relates to an intermediary system for controlling access for a user equipment to at least one local device via the intermediary system. The user equipment is connected to a public network and the at least one local device is connected to a local network. The intermediary system comprises storage means configured to store one or more location conditions for access for the user equipment to the at least one local device. The one or more location conditions relate to a master user equipment. The intermediary system further comprises a connection device that is configured to connect to the local network and to the public network and configured to receive over the public network location information indicating a location of the master user equipment. The intermediary system further comprises an access control device configured to control access for the user equipment to the at least one local device by verifying whether the location information satisfies the one or more location conditions. This intermediary system allows that access for the user equipment may be controlled in dependence of the location of the master user equipment only. The location of the user equipment may not be relevant. The embodiments discussed above are also applicable to this aspect of the disclosure.

Another aspect of the invention relates to a computer program or suite of computer programs comprising at least one software code portion or a computer program product storing at least one software code portion, the software code portion, when run on a computer system, being configured for executing any of the above-described methods.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the user's computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the intermediary system or be stored upon manufacturing of these systems.

Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
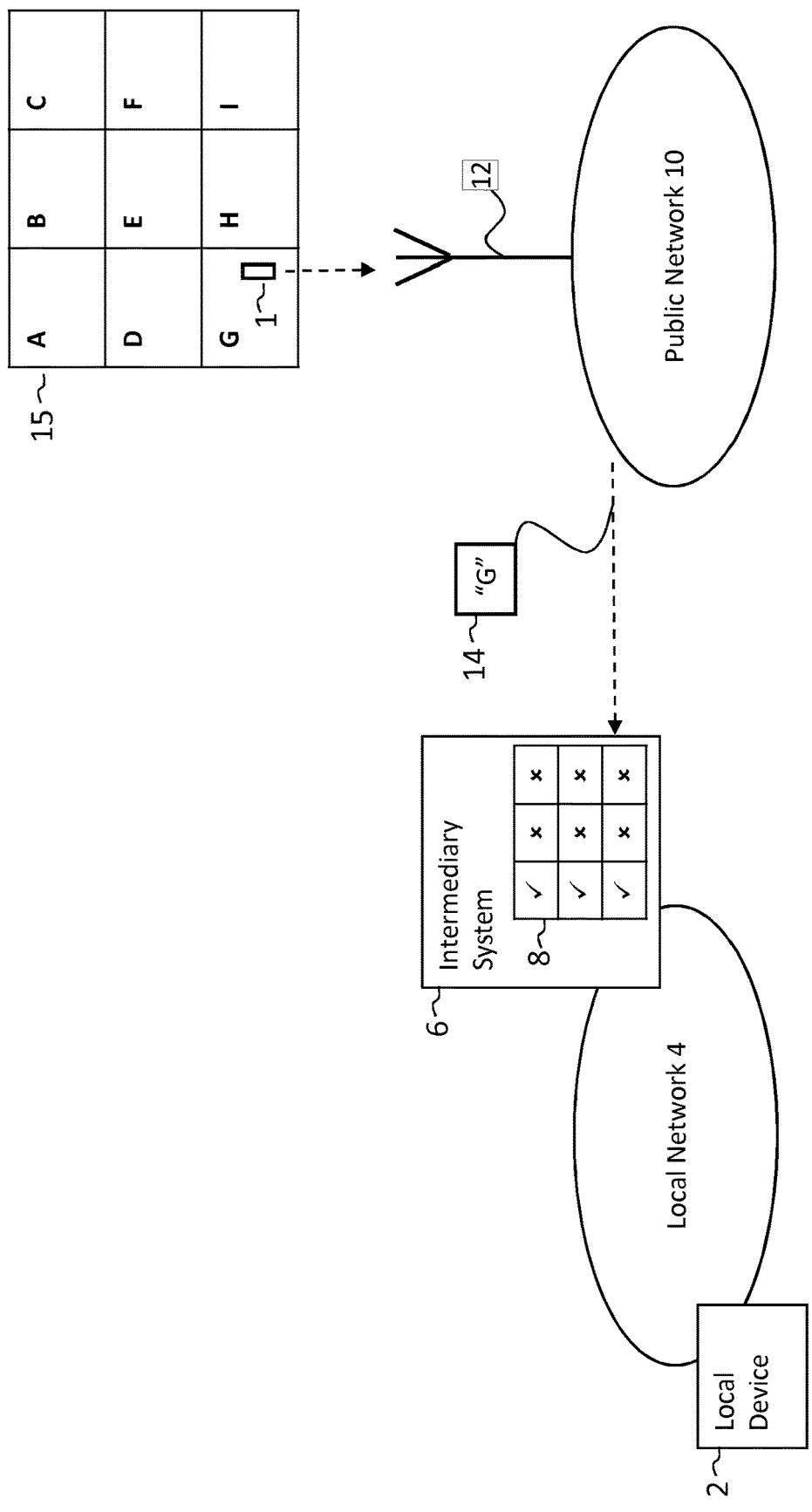
FIG. 1-16 show example situations wherein embodiments of the invention are implemented as well as methods for controlling the access for the user equipment in these example situations according to embodiments of the invention.

FIG. 1 schematically shows a situation wherein an embodiment of the invention is implemented. A local device 2 is connected to a local network 4. The local network 4 is for example a local area network in a house. Local device 2 may be any device that is configured to connect to the local network 4. Examples of such local devices include televisions, desktop computers, tablet computers, mobile phones, but also refrigerators, sound systems, thermostats, cameras, et cetera. In the future, due to the development of the Internet-of-Things, a great variety of devices is expected to be connected to local networks. Some local devices may not be connected to the local network by default. For example, a scale could decide to only connect to the local network once every 24 h to conserve battery power or it might only connect when in use. Another example could be a Network Attached Storage. It could by default turn off and tell the intermediary system 6 that it can awaken it over the network by sending a particular wake up message. Yet another example could be a sensor that might only connect whenever something happens. In the depicted situation, the intermediary system 6 is connected to the local network 4. The intermediary system 6 is also connected to a public network 10, which may be the network of a mobile network operator. The intermediary system may for example be provided by a mobile network operator to a client and be installed in the client's home after which the intermediary system 6 is able to connect to the local network 4 and to the public network 10. The intermediary system may connect to a base station 12 of the public network, or may connect to the public network 10 via a so called femtocell at home. After the intermediary system has been connected to the local network, it may search for local devices that are also connected to the local network 4. Local device 2 may send Universal Plug 'n Play (UPnP) messages announcing its presence in the local network 4. The intermediary system 6 may be configured to capture these announcements and hence discover local device 2 in the local network 4. It should be appreciated that the intermediary system may communicate with local device 2 over the local network 4. Also shown is a user equipment 1 that is connected to the public network 10 via a base station 12. The user equipment may be a mobile phone, or any other device that can connect to a public network. It should be noted that the user equipment need not connect to the public network 10 via a base station 12. The user equipment may also connect to the public network by other means, such as WiFi access points, or via a wired network, or via a lidar based network or even through another public network that is connected to the first public network, for example when the user equipment is roaming. In a typical situation, the public network 10 is a network of a mobile network operator and the user of the user equipment 1 has purchased a subscription from a mobile network operator in order to connect to the network of the mobile network operator. Methods are described in application EP 15197013.4 that enable a user equipment to collect information from local device 2 and/or even control local device 2 from the user equipment 1. It may for example be that the local device 2 is a washing machine and that the user equipment may actually control the washing machine via the public network. For such control and/or information collection, the user equipment 1 needs to access the local device 2. Either to be able to send a control signal, or to be able to receive information from the local device 2. Indicated with 15 is a schematic representation of nine geographical areas A-I. As shown, the user equipment 1 is present in geographical area G. Of course, the user equipment may be mobile and may hence move across different geographical areas. The intermediary system 6 comprises a location condition 8 for access for the user equipment 1 to the local device 2. The schematic representation of the location condition shows that access for user equipment 1 is to be provided if the user equipment 1 is in geographical area A, D or G. This is indicated by the three checkmarks in location condition 8 in the left column corresponding to geographical regions A, D and G. The crosses that are shown in location condition 8 indicate that no access is to be provided for user equipment 1 if the user equipment 1 is in one of the geographical areas B, C, E, F, H, I.

The figure shows that the intermediary system 6 receives the location information 14 "G" via the public network. It should be appreciated that this location information may be determined by the user equipment 1 itself, for example because the user equipment 1 has a GPS functionality and is able to determine its own GPS coordinates. In another example, the location information "G" is determined in the public network 10 using network localization techniques. In any case, this first location information 14 indicating the location of user equipment 1, i.e. "G", is received at the intermediary system 6. After reception, the intermediary system 6 is able to determine whether the location condition 8 is satisfied. As explained above, the location condition is satisfied and hence access may be provided for user equipment 1 to local device 2.

Figure 2:
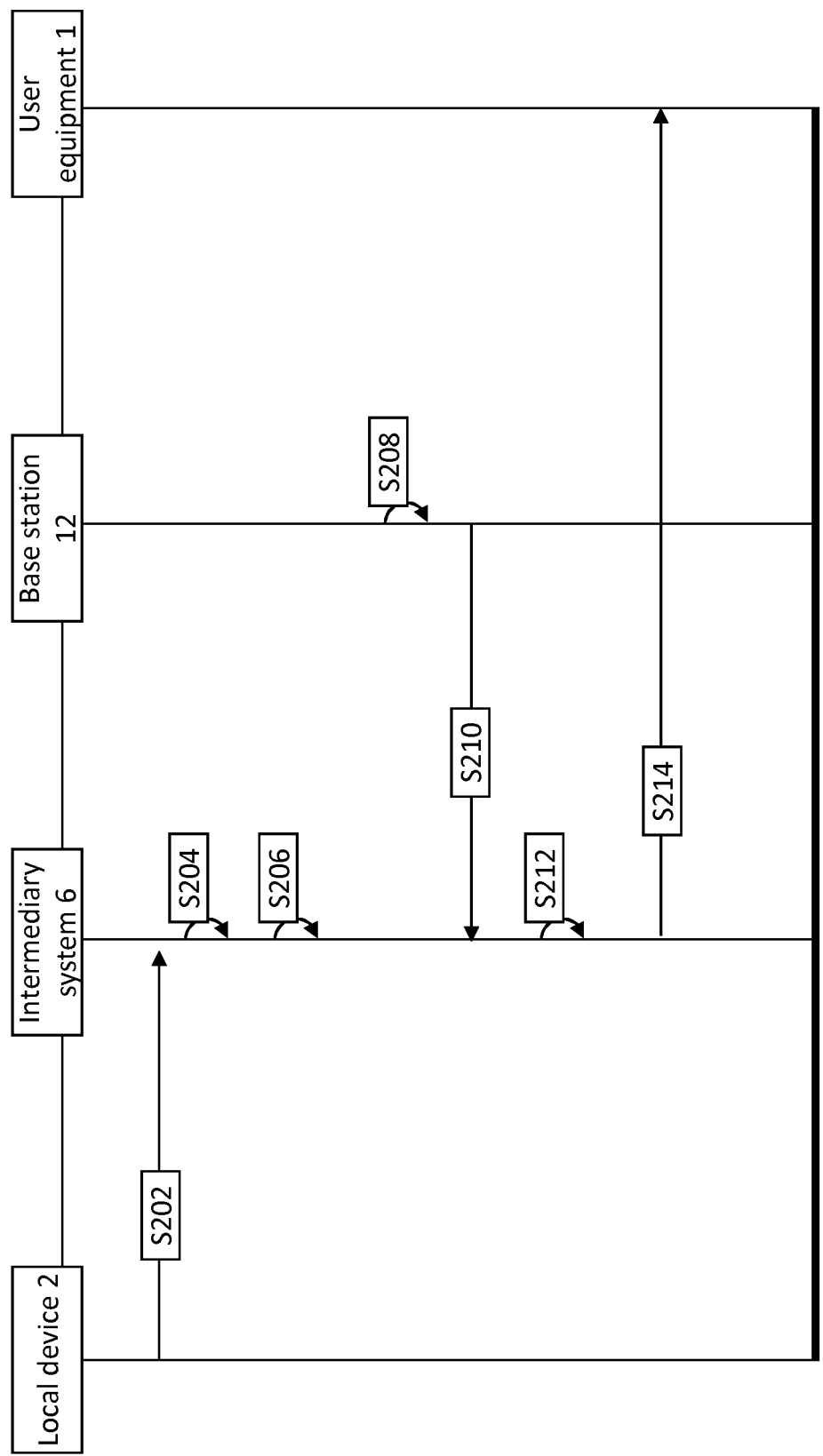

FIG. 2 is a time diagram illustrating how access for the user equipment 1 may be controlled in the situation of FIG. 1. After the intermediary system 6 has been installed and is connected to the public network 10 and to the local network 4, the intermediary system 6 may in step S202 receive over the local network 4 an announcement message of local device 2. The announcement message may be a UPnP message and may comprise a device identifier associated with local device 2. The intermediary system 6 may then in step S204 store this received device identifier. It should be appreciated that the announcement message may also comprise additional information associated with local device 2, such as an address of local device 2, or a current state of local device 2, and that this additional information may also be stored in step S204. In step S206, the location condition 8 is stored in the intermediary system 6. The location condition 8 may be obtained by the intermediary system 6 in various ways. It may for example be that the intermediary system 6 comprises a user interface, e.g. a keyboard, that enables a user to program the location condition 8 into intermediary system. The intermediary system 6 may also receive the location condition from local device 2 over the local network 4, or from a further user equipment over the public network 10, or through an online service that has the location configured. The further user equipment may be a user equipment belonging to an owner of the intermediary system or of local device 2. Step S208 depicts that the location information 14, i.e. "G", of the user equipment 1 is determined in the public network 10, for example by using a network based localization technique. It should be appreciated that step S208 may be performed anywhere in the public network 10 and not per se by base station 12 through which the user equipment 1 is connected to the public network 10. In step S210 the intermediary system 6 receives the location via the public network 10. Again, although it is depicted that the intermediary system 6 receives the information from base station 12, in reality this may be any base station or node in the public network 10. In step S212 the intermediary system 6 verifies whether the received first location information satisfies the location condition 8. After the intermediary system 6 has verified that the first location information indeed satisfies location condition 8 (as explained above), access for the user equipment 1 to local device 2 is provided. In this example, access is provided for the user equipment by transmitting in step S214 for the user equipment 1 the device identifier received in step S202 from the local device 2. It should be appreciated that in this manner access to the local device 2 is provided for the user equipment 1, in the sense that user equipment 1 receives information from the local device 2 in step S214, namely the device identifier of the local device 2.

Figure 3:
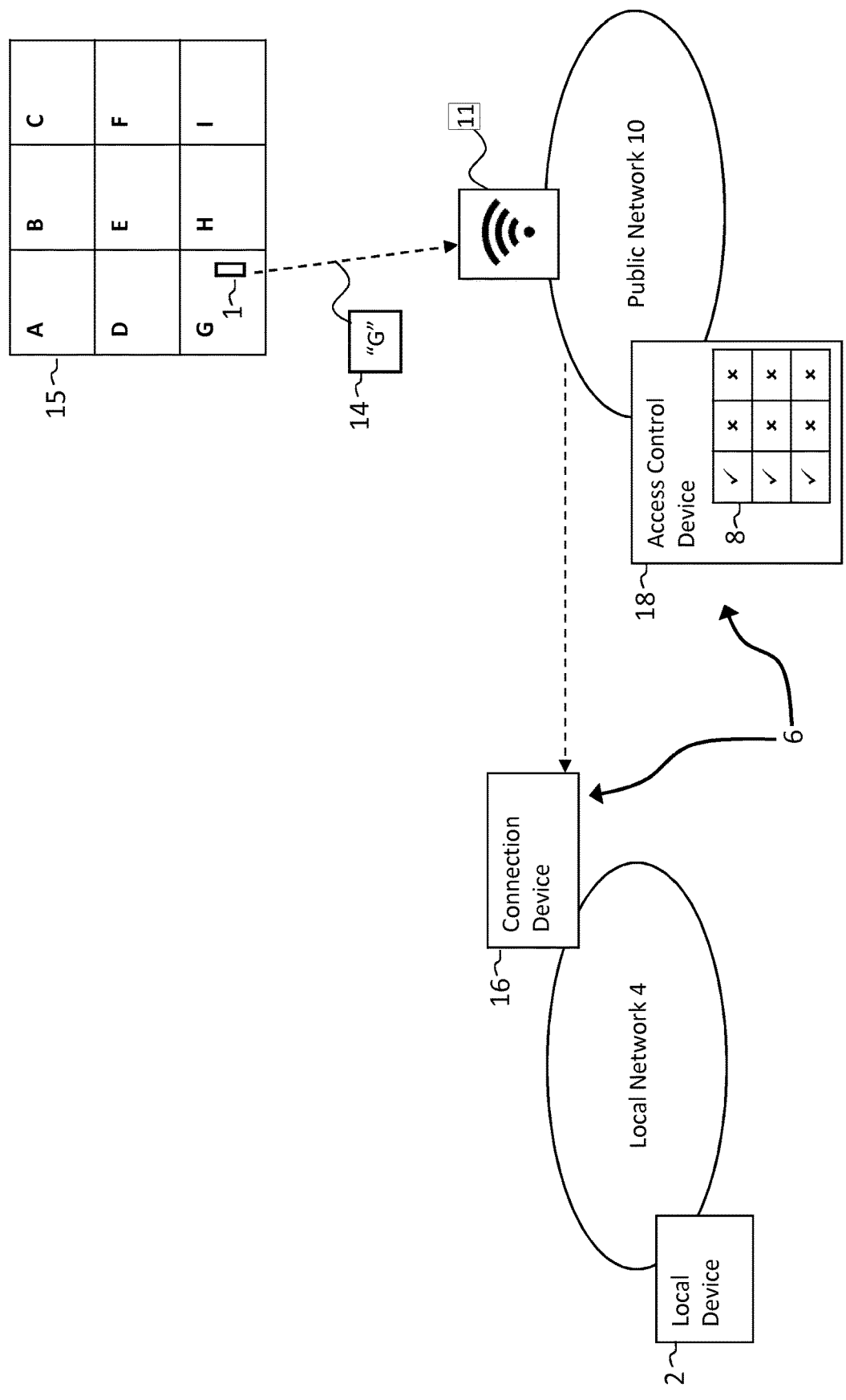

FIG. 3 shows another situation wherein an embodiment of the invention is implemented. Herein the intermediary system 6 comprises a connection device 16 and an access control device 18. The connection device 16 is connected to the local network 4 and the access control device sits somewhere in the public network 10. The location condition 8 is identical to the location condition in the situation of FIG. 1 and is stored in the access control device 18. Note that the user equipment 1 is connected to the public network 10 through a WiFi access point 11. As explained, the 3GPP Generic Bootstrapping Architecture (GBA) or other 3GPP standardized technologies (ref 3GPP TS 23.402) allow the use of radio technologies, such as WiFi or other wired network. These technologies may comprise connecting via a secure tunnel to the public network using any kind of radio technology or wired technology. The WiFi access point could be an access point that is managed by the Mobile Network Operator, in which case it can be configured to be accessed using operator credentials. The WiFi access point could also be a generic access point, not necessarily managed by the operator, that provides access to the "internet". As indicated by the representation 15 of nine geographical areas, the user equipment 1 is in area G. Therefore, access to the local device 2 for the user equipment 1 will be provided. Also note that in this situation the location G is transmitted from the user equipment 1 to the public network 10. The user equipment 1 is able to determine its location, for example by determining its GPS coordinates.

Alternatively, the operator might also have learned that the user equipment is connected to an access point of which it knows the location, "G" in this example. The public network can then infer that the user equipment is at location "G" as well.

Figure 4:
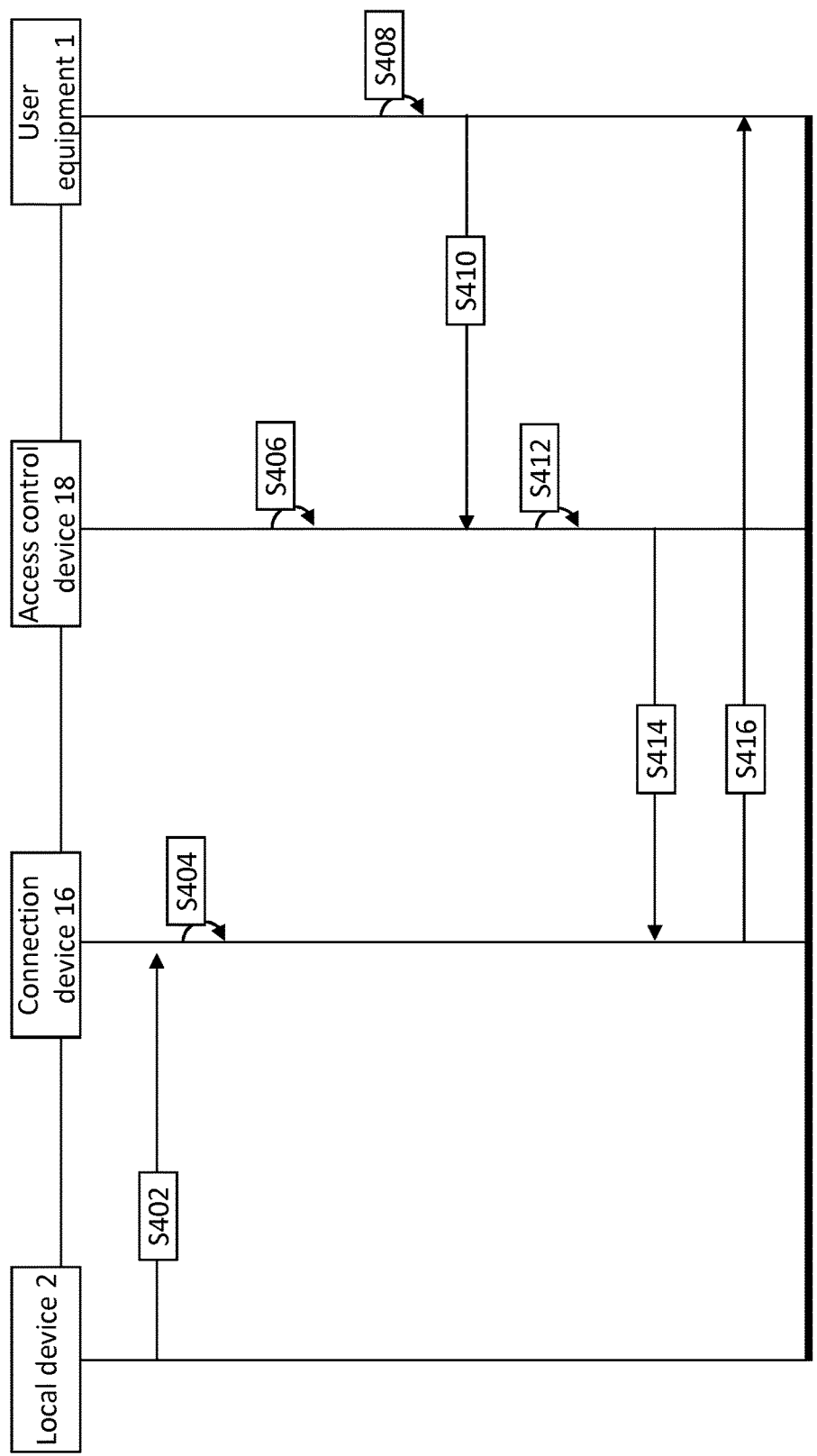

FIG. 4 is a time diagram illustrating how access for the user equipment 1 may be controlled in the situation of FIG. 3. In step S402 the connection device 16 receives over the local network 4 from the local device 2 an announcement message comprising a device identifier associated with local device 2 and a state of the local device 2. It should be appreciated that the state of local device 2 may relate to any parameter associated with the local device. The state may for example relate to a connection state of the local device indicating a state of the connection with the local network, or to an operational state, such as "on" or "off", or to an aspect that is specific to the local device, such as the temperature of a refrigerator or the volume of a sound system, or a state of a sensor device of a security system, e.g. "motion detected" or "door opened". In step S404 the connection device 16 stores the received device identifier and the state associated with local device 2. In step S406, the access control device 18 stores location condition 8. Note that this location condition may be obtained in various ways, such as receiving the location condition from a further user equipment over the public network 10, or from the connection device 16 over the public network, et cetera. In step S408 the user equipment 1 determines its location by determining its GPS coordinates. In step S410 the access control device 18 receives via the WiFi Access point 11, the GPS coordinates of the user equipment 1. Note that in FIG. 3 the transmitted "G" represents these GPS coordinates. After reception at the access control device 18, in step S412, the access control device 18 verifies whether the GPS coordinates satisfy location condition 8 stored in step S406. The GPS coordinates indeed satisfy location condition 8 as explained, and thus access for the user equipment 1 to the local device 2 is provided. The access is provided in steps S414 and S416, wherein in step S414 a message is transmitted over the public network 10 from the access control device 18 and received at connection device 16. Alternatively, providing the access may comprise configuring the connection device to route traffic between the user equipment and the local device. Conversely, denying access may then comprise not configuring the connection device to route traffic between the user equipment and the local device. The message instructs the connection device 16 to transmit the device identifier and state received in step S402 and stored in step S404 for the user equipment 1. The user equipment 1 may be configured to generate a virtual representation of the local device 2 in the local network based on the received information. The virtual representation may thus comprise the state of the local device 2 and may be presented to a user on a display. Hence the user may have access to the local device 2 in the sense that the user is able to see what the current state of local device 2 is.

Figure 5:
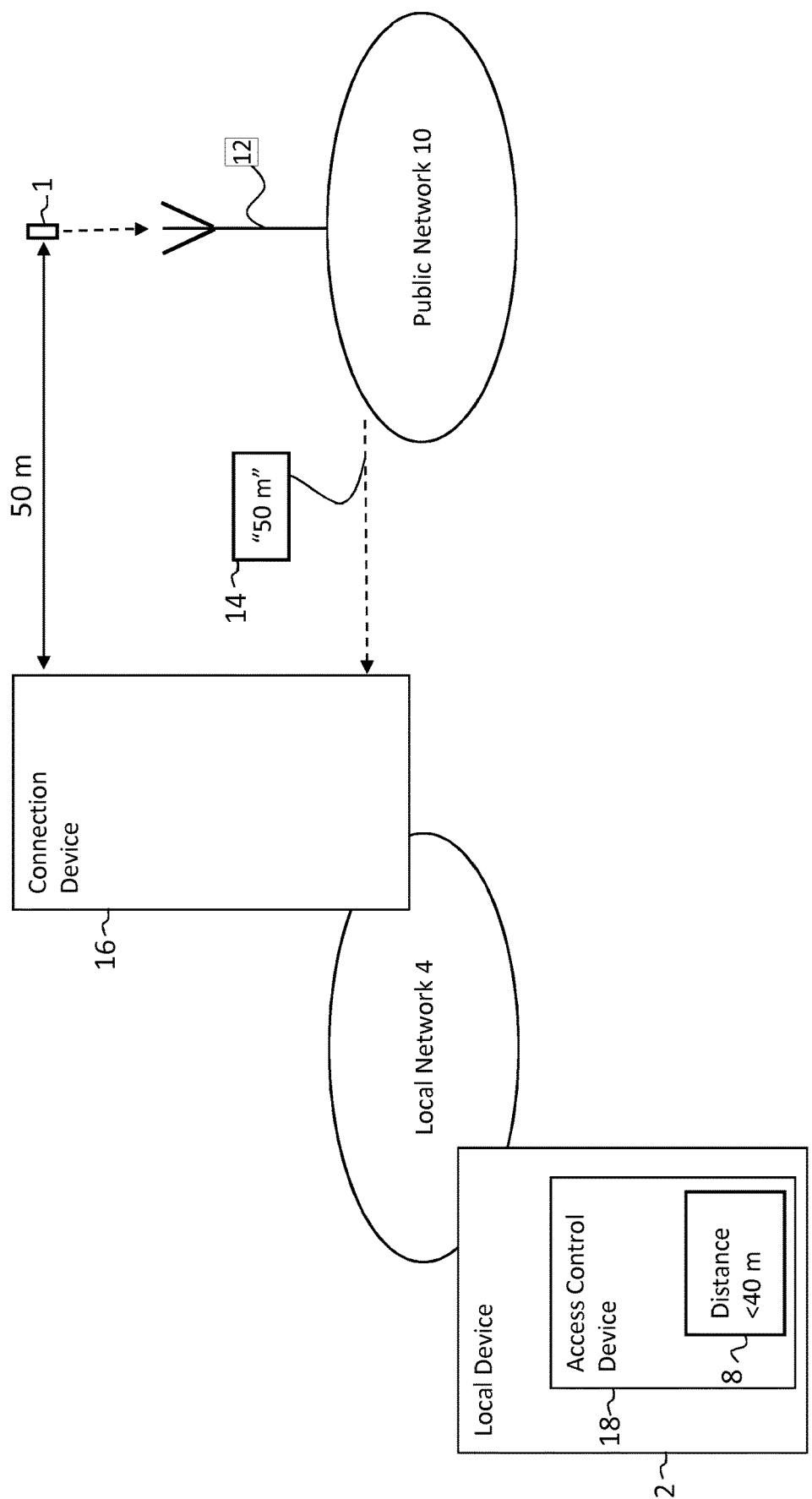

FIG. 5 shows yet another situation wherein an embodiment of the invention is implemented. Herein the user equipment 1 is at a location 50 meters from the intermediary system 6 as the user equipment 1 is 50 meters away from the connection device 16. The first location information 14 comprises the 50 meters distance and is transmitted from the public network to the connection device 16. The distance between the user equipment 1 and the connection device 16 may be determined in the public network 10. With network based localization techniques the location of the connection device 16 and the location of the user equipment 1 may be determined. Subsequently based on these locations, the distance may be calculated in the public network 10. Note that the first location information 14 indicates a location of the user equipment 1 in the sense that it indicates a location relative to the intermediary system 6. The access control device 18 is implemented in local device 2 connected to the local network and the location condition 8 is stored in the access control device 18. The location condition 8 in this example specifies that the user equipment 1 should be at a location that is closer to the connection device 16 than 40 meters. Hence, no access will be provided to the local device 2 for the user equipment 1.

Figure 6:
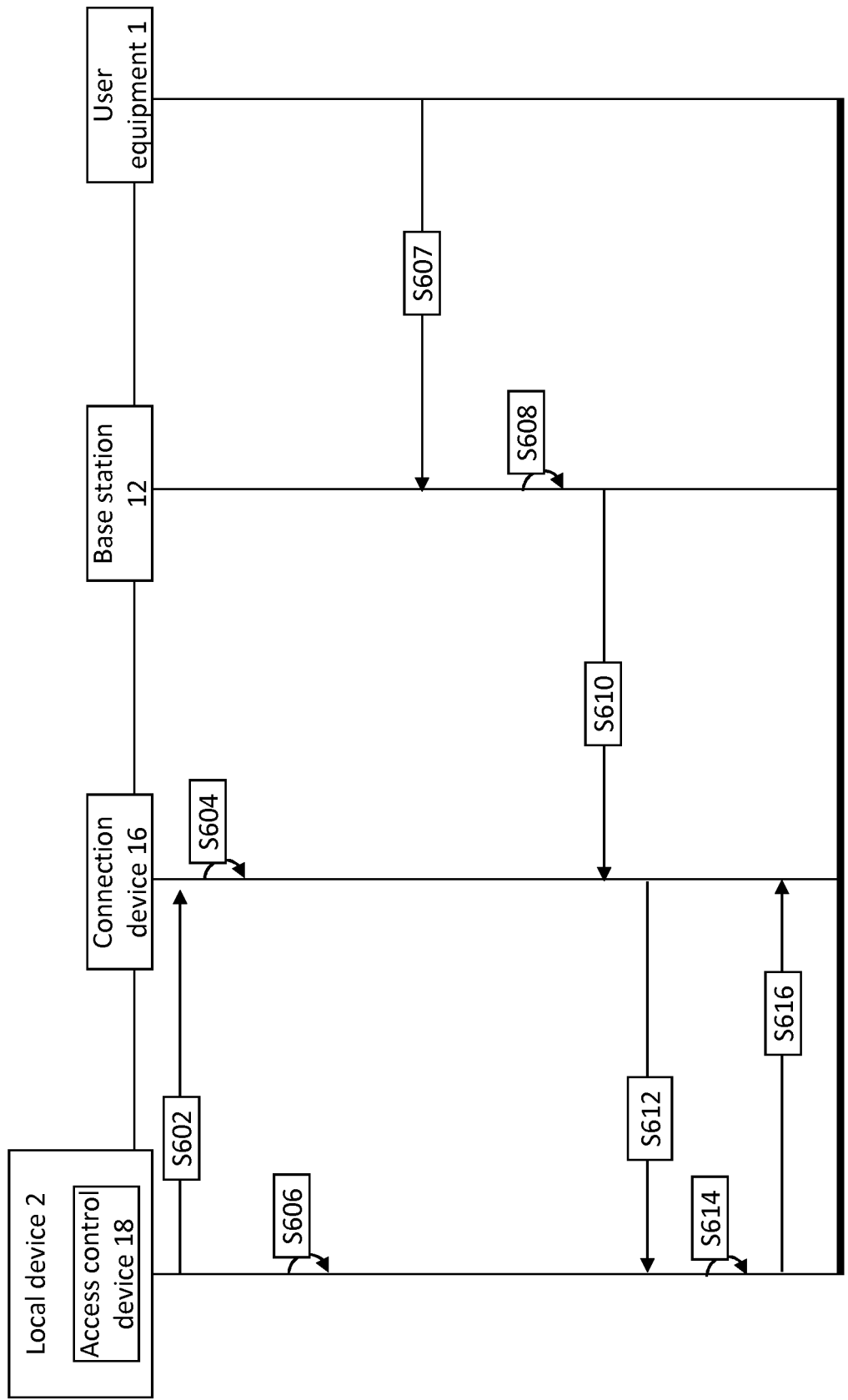

FIG. 6 is a time diagram illustrating how access for the user equipment 1 may be controlled in the situation of FIG. 5. Steps S602, S604 are identical to respective steps S202, S204 described above with reference to FIG. 2. Hence after step S604 a device identifier associated with local device 2 is stored in the intermediary system 6, in particular in the connection device 16. In step S606 the location condition 8 is stored in the access control device 18 in local device 2. It should be appreciated that the local device 2 may obtain location condition 8 in various ways, for example by a user programming the location condition 8 into the local device 2. In step S607 the user equipment 1 sends a general request for information about local network 4 and devices connected to local network 4. A user of user equipment 1 may wish to see which local devices are connected to local network 4. In step S608 the distance of the user equipment 1 from the connection device 16 is determined in the public network 10. As explained, the base station may calculate the distance using network based localization techniques. In step S610 the distance between the intermediary system 6 and the user equipment 1 is received at the connection device 16. Note that in this example the determined distance is the first location information 14. In step S612, the connection device 16 transmits the first location information 14 to the local device 2 over the local network 4, in particular to the access control device 18 that is implemented in the local device 2. In step S614 the access control device 18 verifies whether the received distance satisfies the location condition 8. As explained above, the location condition 8 is not satisfied, since the condition is that the user equipment 1 is closer than 40 meters to the intermediary system. As a result access to the local device for user equipment 1 is denied. In step S616 the connection device 16 receives from the local device 2 that access for the user equipment has been denied. Hence, the connection device will not send the device identifier stored in step S604 to the user equipment 1. In this example, access for the user equipment is denied in the sense that no information from the local device 2 is transmitted to the user equipment 1. Hence the user of user equipment 1 will not be able to see that local device 2 is connected to the local network 4.

Figure 7:
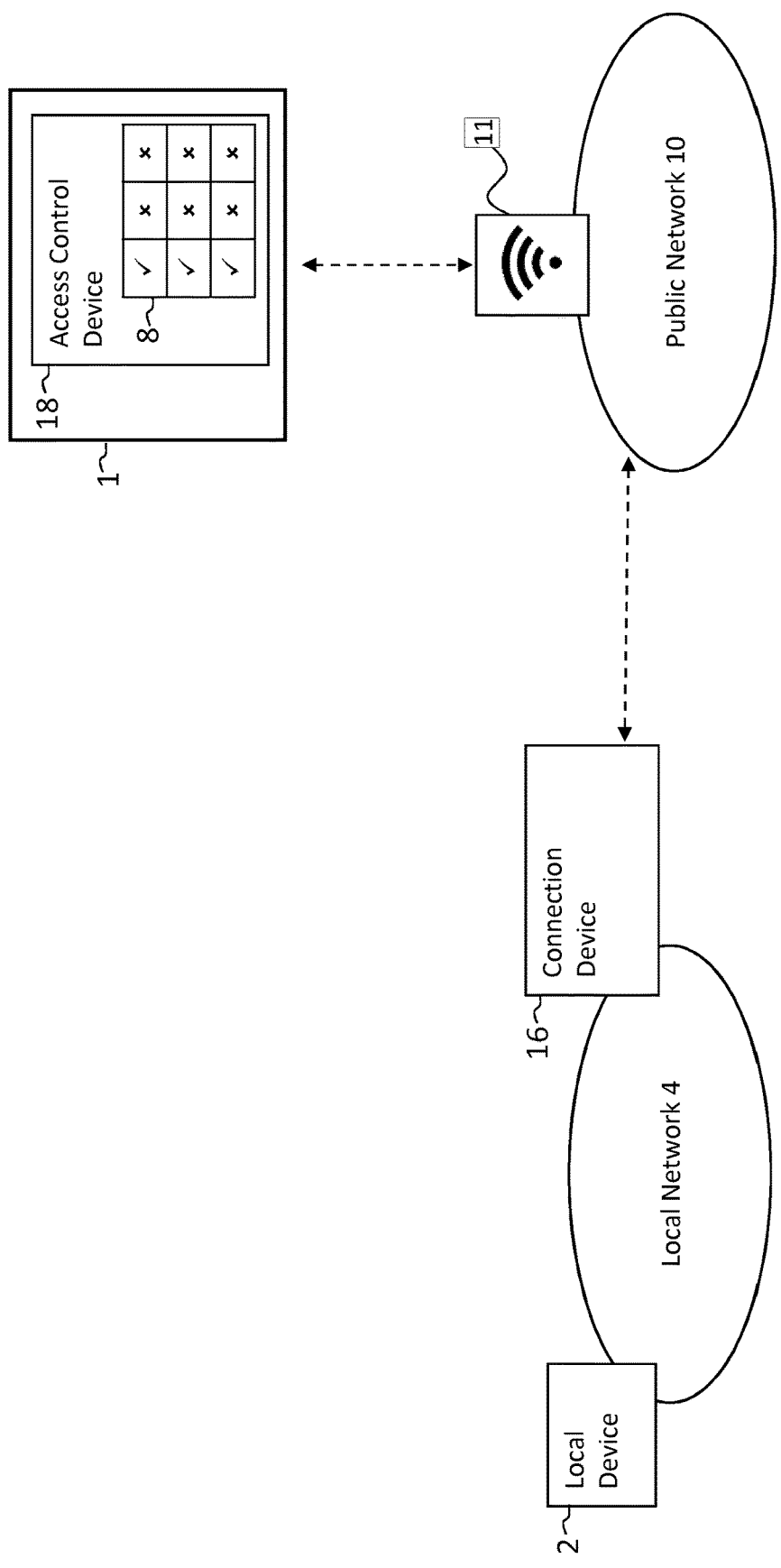

FIG. 7 schematically shows yet another situation wherein an embodiment of the invention is implemented. Again local device 2 is connected to the local network 4 as well as connection device 16. Connection device 16 is also connected to the public network 10. Note that the access control device 18 is implemented in the user equipment 1 and that the access control device 18 has stored the first location condition 8. User equipment 1 has access to the public network 10 via a WiFi access point.

Figure 8:
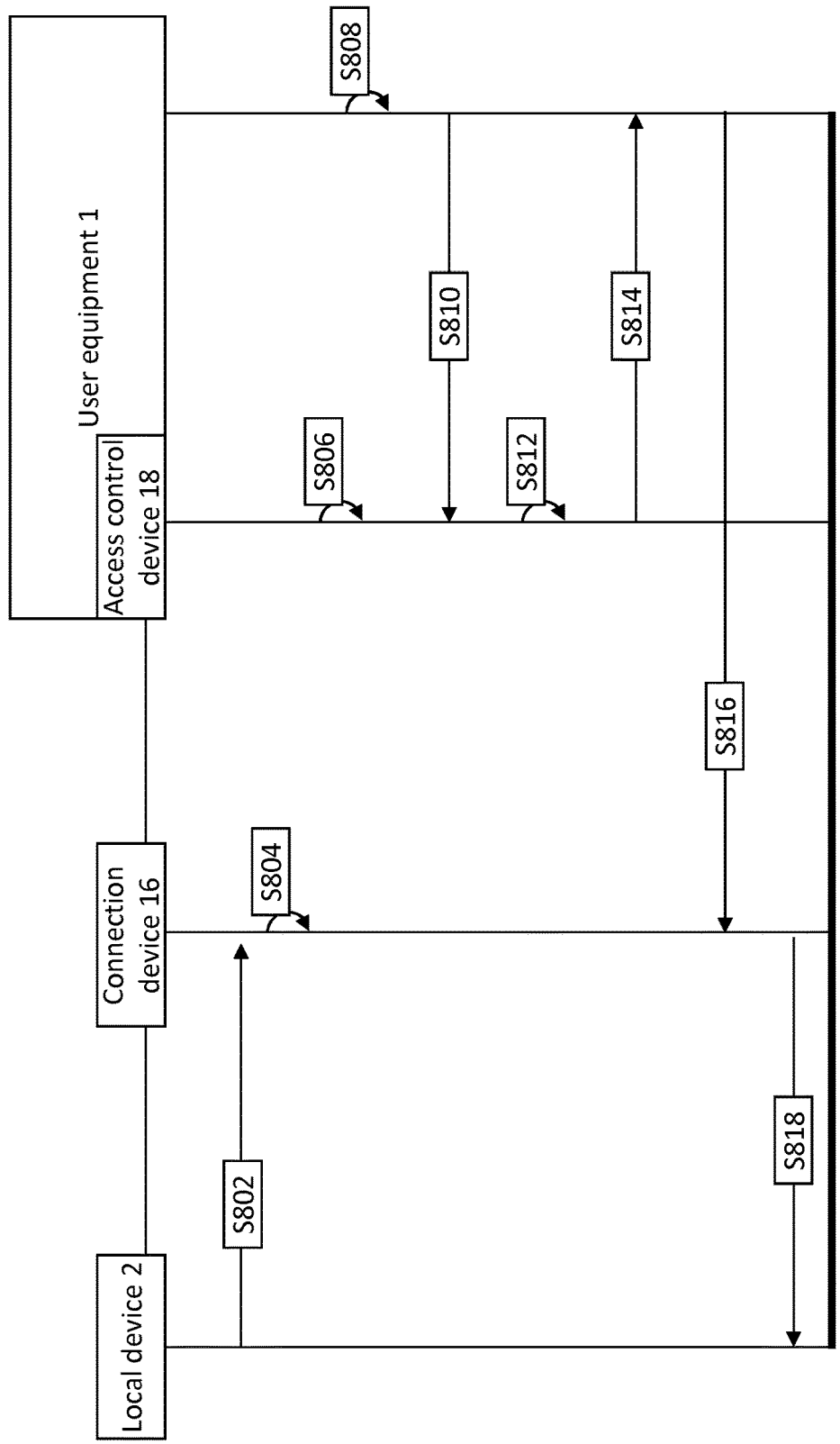

FIG. 8 is a time diagram illustrating how access control may be performed in the situation of FIG. 7. First, in step S802 the connection device 16 captures an announcement message of the local device 2 over the local network. In this example the announcement message comprises a device identifier associated with the local device 2 and an address of the local device 2 in the local network 4. In step S804 the connection device 16 stores the captured device identifier and the address. In step S806 the access control device 18, which is implemented in the user equipment 1, stores the first location condition 8. Step S808 depicts that the user equipment 1 determines its location. It may be that an application running on the user equipment determines the GPS coordinates of the location of the user equipment 1. This information is then in step S810 received at the access control device 18. Note that, since the access control device is implemented in user equipment 1, no external connections are required. In step S812, the access control device 18 verifies whether the location of the user equipment satisfies the first location condition 8. In this example we assume the first location condition 8 is indeed satisfied by the first location information. Then, in step S814, the access control device informs the user equipment 1 that access to the local device 2 has been provided. Subsequently, the user equipment 1 will send in step S816 a control signal to the connection device 16 over the public network 10. The control signal comprises the device identifier of the local device 2 and an instruction for the local device 2. The control signal may for example instruct the local device 2 to switch on. The connection device 16 receives in step S816 the control signal from the user equipment 1 via the public network. Since the connection device has stored in step S804 the device identifier and the address of the local device 2, and since the control signal comprises the device identifier of the local device, the connection device 16 is able to route the control signal to the local device 2 via the local network 4. In step S818 the connection device 16 transmits the control signal over the local network to the address of the local device 2. Upon receipt of the control signal the local device may for example switch on. It should be appreciated that access for the user equipment 1 has been provided in the sense that the user equipment can control the local device 2 via the public network 10.

Figure 9:
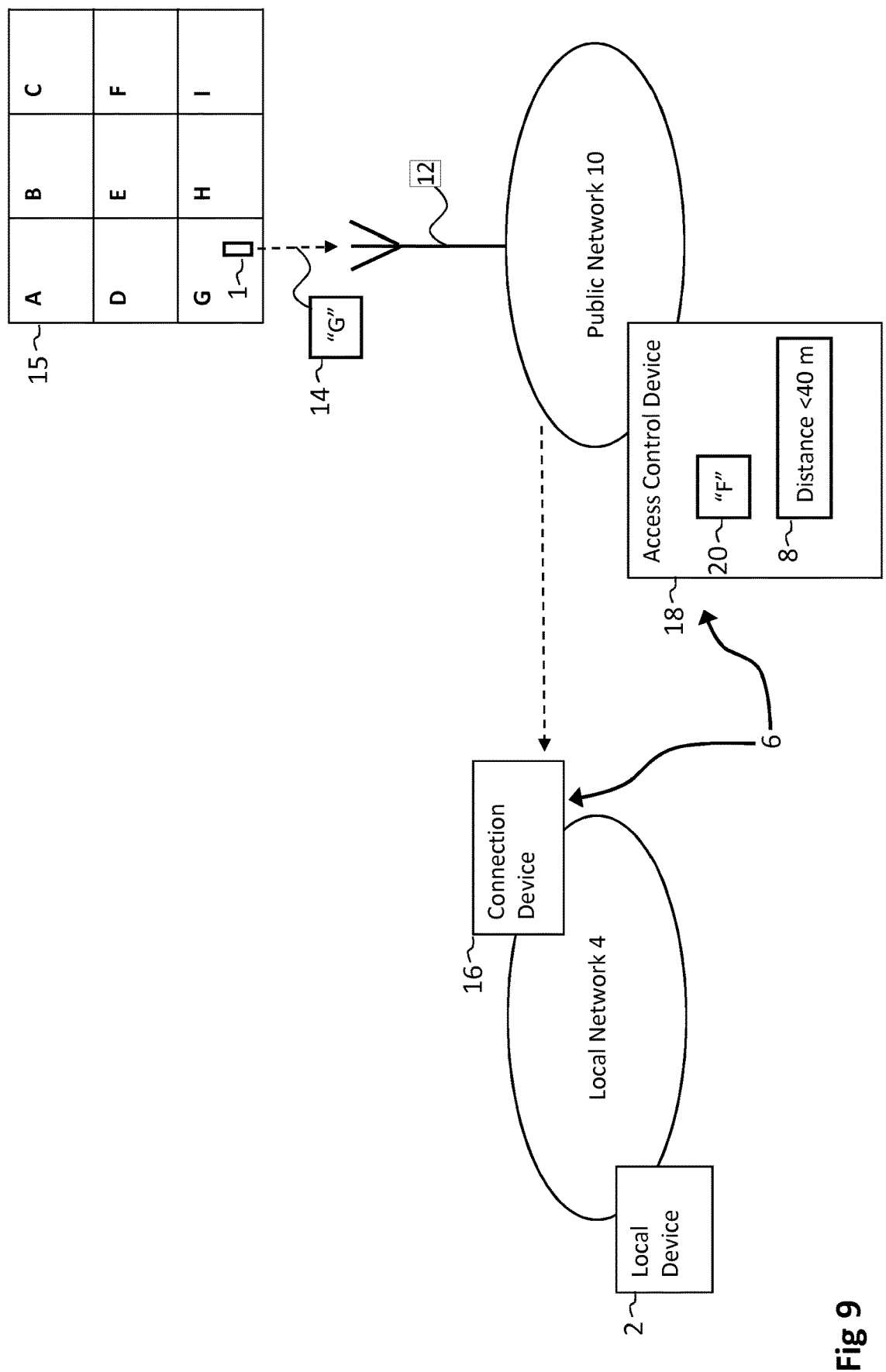

FIG. 9 shows yet another embodiment of the invention. Herein the intermediary system 6 comprises a connection device 16 and an access control device 18. As shown, the user equipment 1 is in geographical area G. The connection device is in geographical area F (not shown in the representation 15 of the geographical areas). The access control device 18 sits somewhere in the public network and has stored the second location information 20 indication a location, being "F", of the connection device 16. Also note that the location condition 8 is a proximity condition and specifies that the user equipment should be within 40 meters from the connection device 16, else no access is provided for the user equipment 1.

Figure 10:
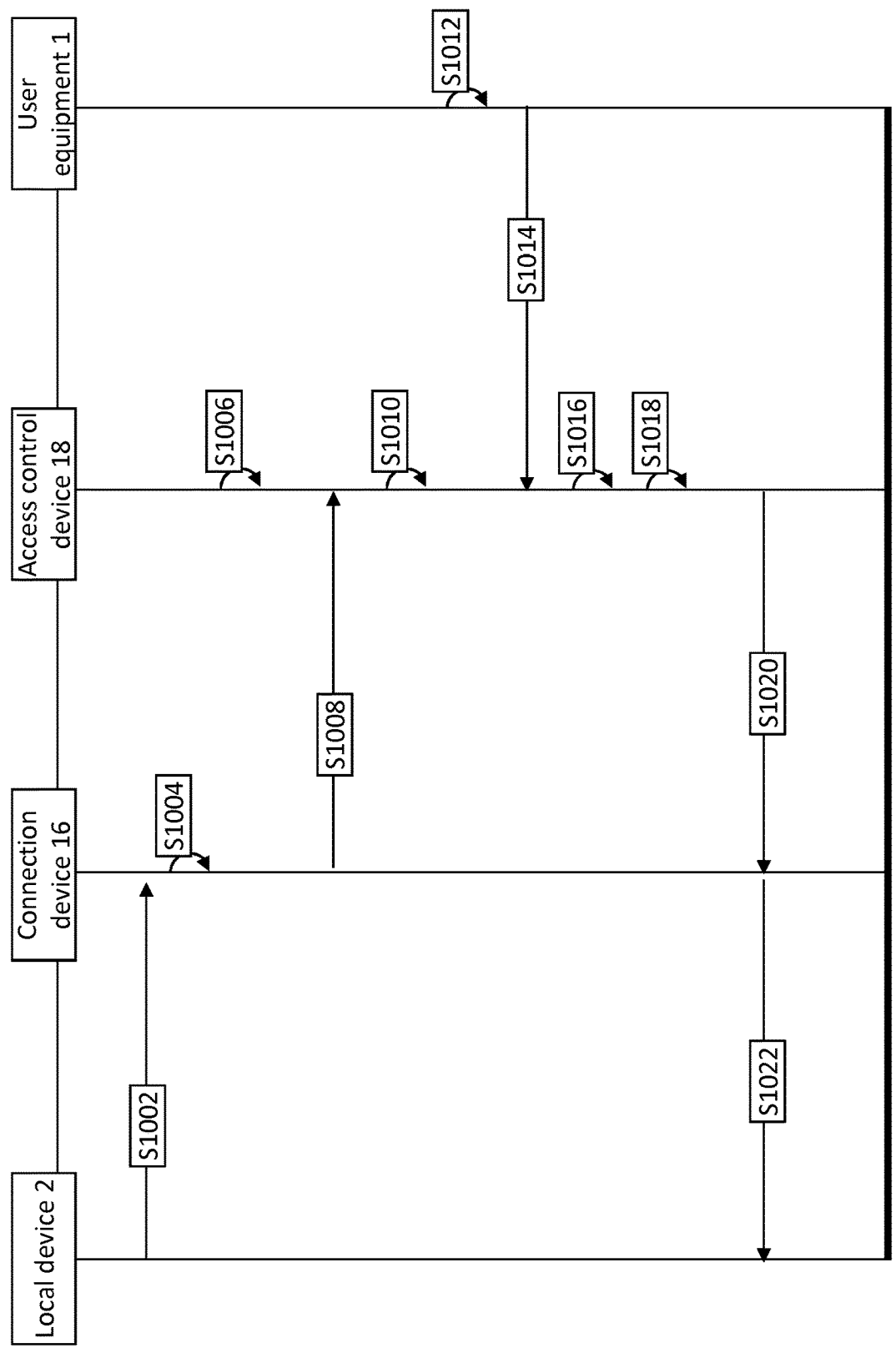

FIG. 10 is a time diagram illustrating how access for the user equipment 1 may be controlled in the situation of FIG. 9. In step S1002 the connection device 16 captures an announcement message broadcast by local device 2 over the local network 4. The announcement message comprises a device identifier of the local device 2 and the address of the local device 2 in the local network 4, which are both stored in step S1004 in the connection device 16. In step S1006 the access control device 18 stores the location condition 8. In the present example, the location condition 8 specifies that the user equipment 1 should be within 40 meters distance from the connection device 16 for access to be provided for the user equipment 1 to the local device 2. In step S1008 the connection device 16 transmits via the public network its location, which is the second location information 20, for the access control device 18. Alternatively (not shown) the location of the connection device 16 may be determined in the public network 10, which is possible because the connection device 16 is connected to the public network 10. As depicted in FIG. 9, the second location information indicates that the connection device 16 is present in geographical region F. In step S1008 the access control device 18 receives this information 20 from the connection device 16 and in step S1010 stores the location of the connection device 16. In step S1012 the user equipment determines the first location information by determining its location. As indicated in FIG. 9, the location of the user equipment 1 is geographical area G. In step S1014 the access control device 18 receives a control signal from the user equipment 1 for the local device 2 over the public network. The control signal comprises the device identifier of the local device 2, based on which the connection device 16 is able to route the control signal to the local device 2. It should be appreciated that the user equipment 1 may have obtained this device identifier in various ways, for example because the device identifier was transmitted earlier from the connection device 16 to the user equipment 1 (not shown). The control signal may for example instruct a refrigerator to set the temperature at a certain level. In step S1016, based on the stored second location information, F, and the first location information received in step S1014, G, the access control device 18 determines the distance between the connection device 16 and the user equipment 1. Assume that the distance between the connection device 16 and the user equipment 1 is determined to be 20 meters. Then, in step S1018, the access control device 18 verifies whether the distance satisfies the location condition 8, which is indeed the case, since the location condition 8 specifies that the user equipment should be within 40 meters from the connection device. Hence, access is provided for the user equipment 1 to the local device 2. In this example, the access control device forwards the control signal to the connection device 16 in step S1020. In step S1020 this control signal is received at the connection device 16 over the public network. In step S1022, the connection device routes the control signal to the local device 2 over the local network, based on the device identifier in the control signal and the address of the local device 2 in the local network, which was stored in step S1004.

Figure 11:
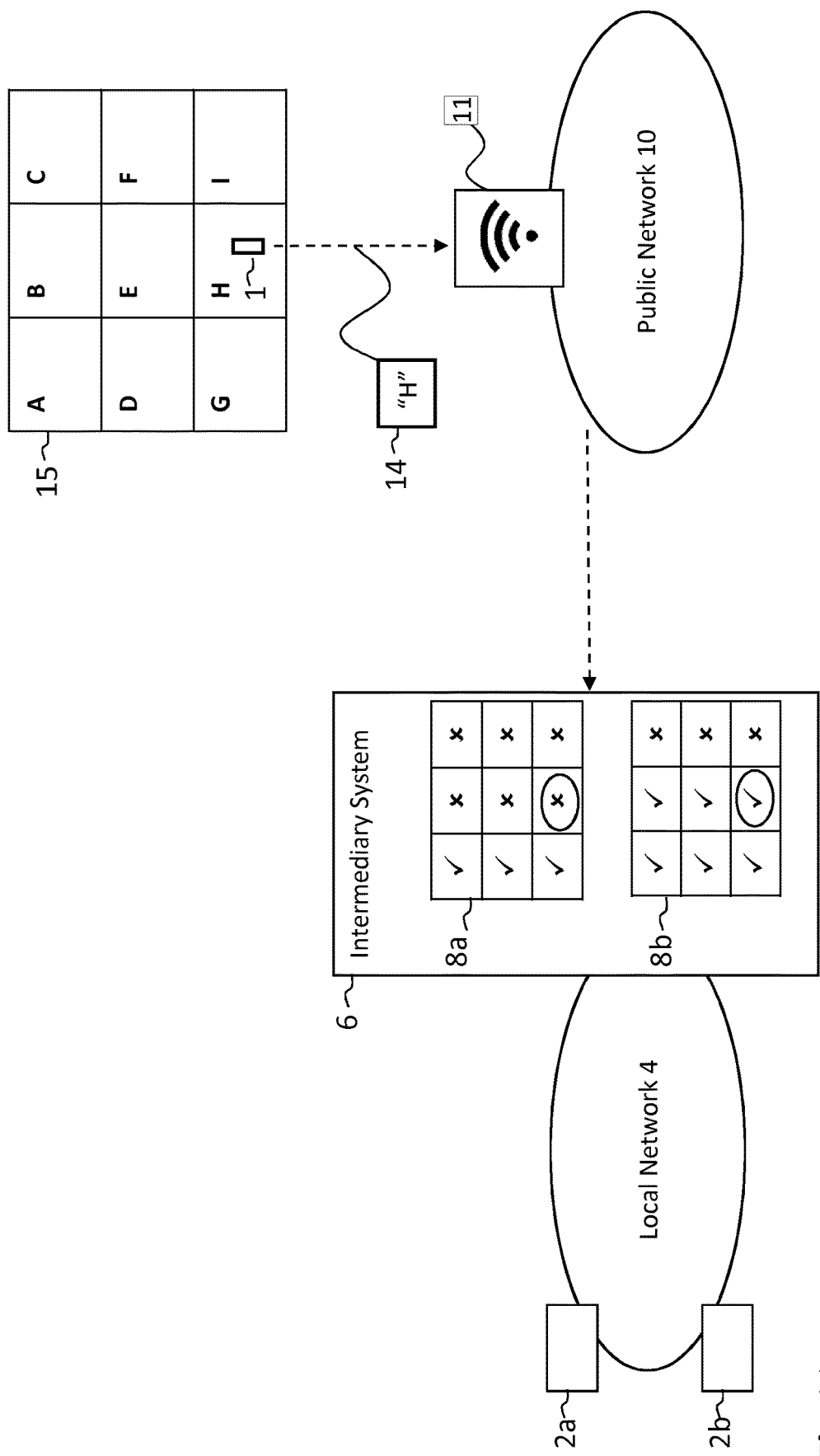

FIG. 11 schematically shows a situation wherein an embodiment of the invention is implemented. Two local devices 2a and 2b are connected to the local network 4. Furthermore, the intermediary system has stored a first location condition 8a that is associated with local device 2a and has stored a second location condition 8b that is associated with local device 2b. Note that the location conditions 8a and 8b differ from each other. In this example the user equipment 1 is in geographical area H and is connected to the public network 10 via a WiFi access point 11. The first location information, "H", is received at the intermediary system 6. Depending on which local device user equipment 1 wants to access, access will be provided or denied. As indicated by the circled cross in location condition 8a, the first location information "H" will not satisfy the first location condition 8a. Hence no access to local device 2a will be provided for the user equipment 1. On the other hand, the first location information will satisfy the second location condition 8b as indicated by the circled check mark. Thus access to local device 2b will be provided for user equipment 1.

Figure 12:
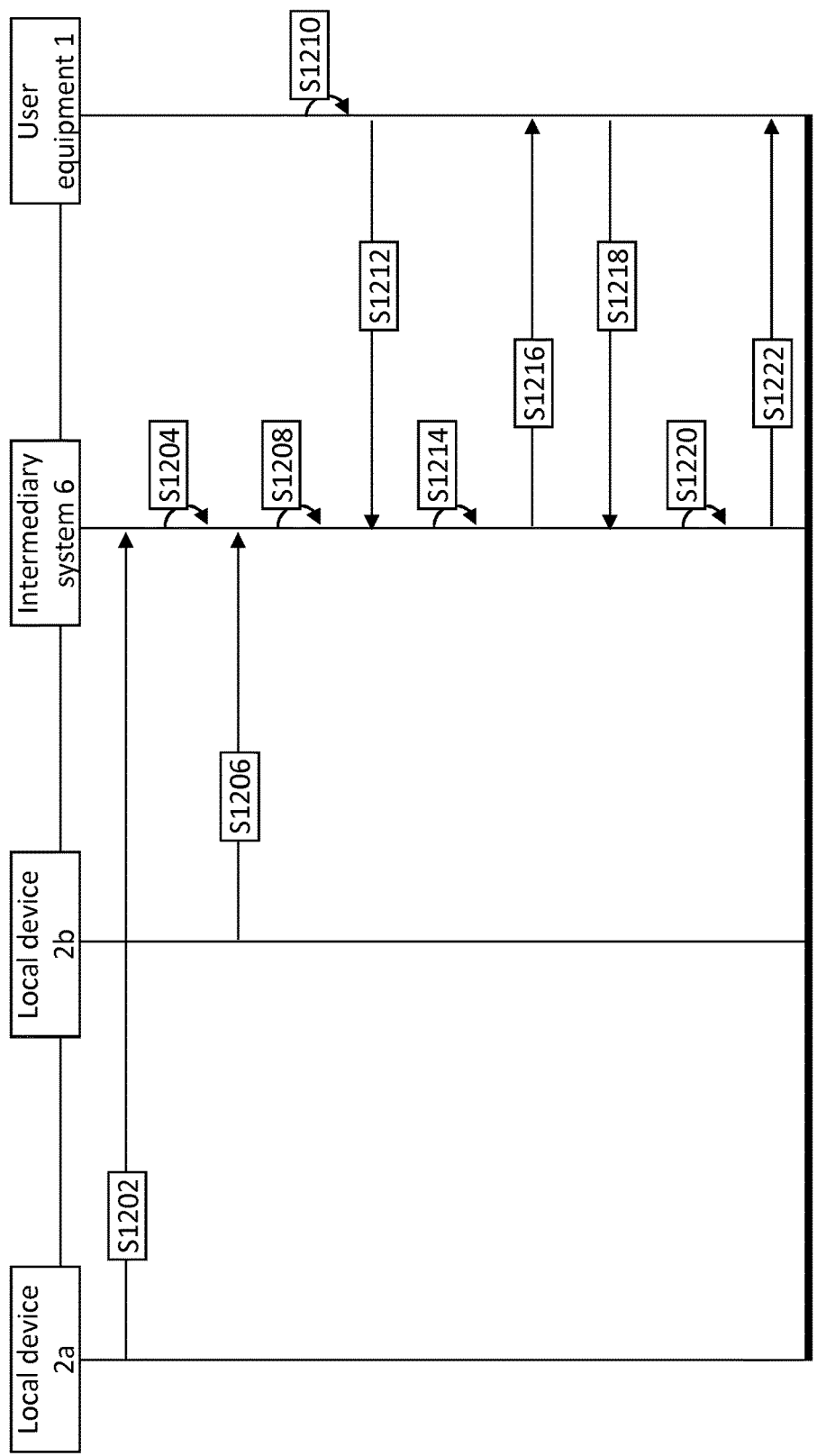

FIG. 12 shows a time diagram illustrating how access to local devices 2a and 2b may be controlled in the situation of FIG. 11. First, in step S1202 the intermediary system 6 receives from local device 2a a device identifier associated with local device 2a and a current state of local device 2a. In step S1204 the intermediary system stores this device identifier and the state of local device 2a. Similarly, in steps S1206 and 1208, the intermediary system 6 receives a device identifier and a state of local 2b and stores these. In step S1210, the user equipment 1 determines its location. The intermediary system 6 receives in step S1212 a request from the user equipment to receive the current state of the local device 2a. This request comprises the first location information determined by the user equipment 1 in step S1210 and comprises the device identifier of local device 2a, which was also stored in intermediary system 6 in step S1204. As explained above with respect to FIG. 11, the first location condition 8a is not satisfied by the first location information. Therefore, after the intermediary has verified in step S1214 that the first location condition 8a is not satisfied, the intermediary system 6 denies access for the user equipment 1. In step S1216, the intermediary system 6 sends a message to the user equipment 1 indicating that access to the local device 2a has been denied. In step S1218 the intermediary system receives from user equipment 1 a request for the current state of local device 2b, which was received and stored in steps S1206 and S1208 respectively. The request for the current state of local device 2b comprises the first information location determined in step S1210 by the user equipment 1 and comprises the device identifier of local device 2b. In step S1220, the intermediary system verifies that the first location information satisfies the location condition 8b. Hence, in step S1222, the intermediary system 6 transmits to the user equipment 1 the current state of local device 2b. Herewith access for the user equipment 1 to the local device 2b is provided. This example shows that different location conditions may apply for different local devices connected to the local network 4.

Of course, in case there are multiple user equipments, 1a and 1b for example, that request to receive a state of a local device, different location conditions may apply for each user equipment. It may be that access to the local device for a user equipment 1a is provided only if user equipment 1a is in region A and that access to the local device for a user equipment 1b is provided if user equipment 1b is in region A, B or C.

Figure 13:
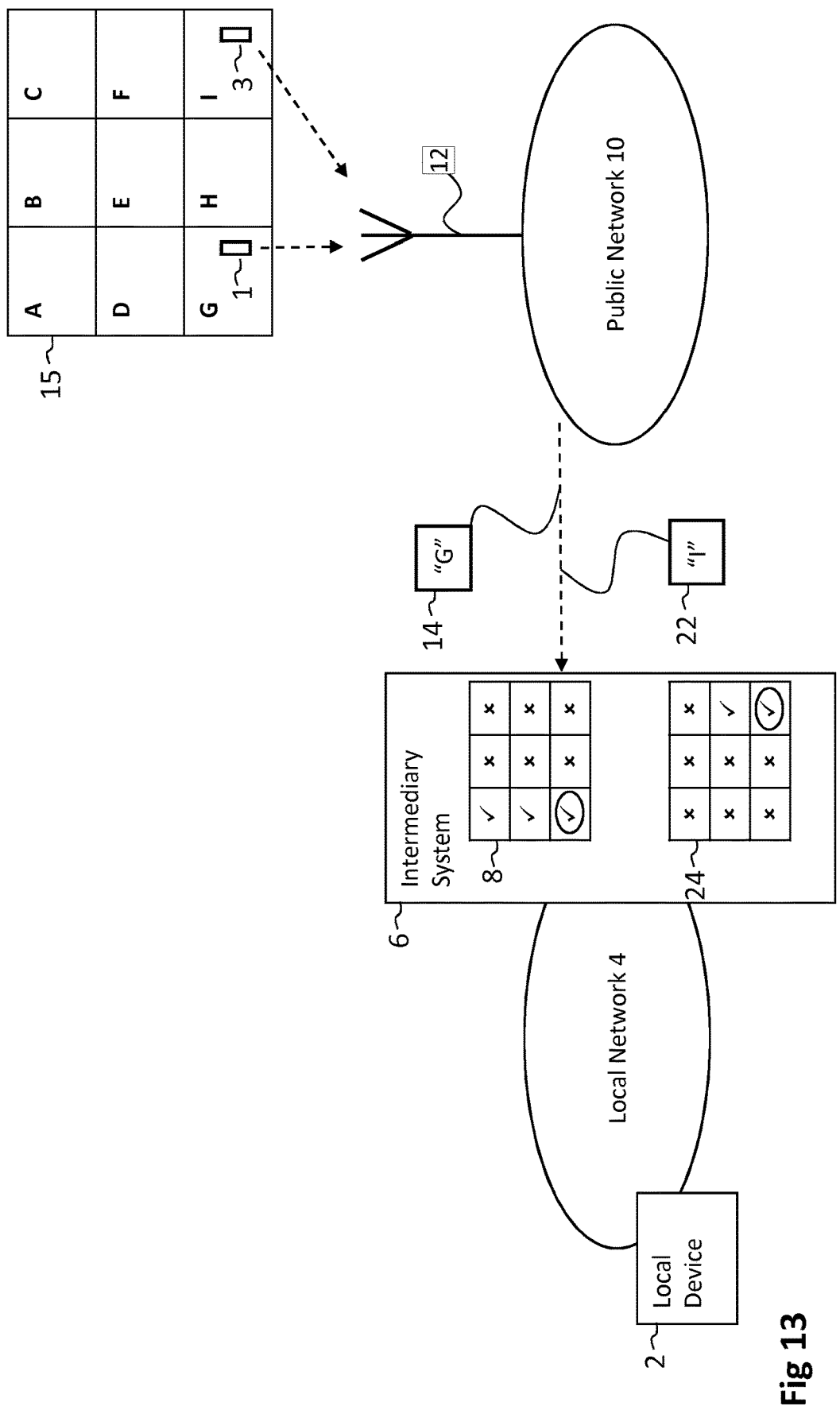

FIG. 13 shows yet another situation wherein an embodiment of the invention is implemented. As in the above described situations, local device 2 is connected to the local network 4 and intermediary system 6 is connected to the local network 4 and to the public network 10. Note that the intermediary system has stored a first location condition 8 for access for the user equipment 1 to the local device 2. In addition, the intermediary system has stored a further location condition 24. The further location condition relates to a third user equipment 3 as will be explained below. The user equipment 1 is in geographical region G and the further user equipment 3 is in geographical region I. Both are connected to the public network 10 via a base station 12. It should be appreciated that, since user equipment 1 and user equipment 3 are in different geographical regions, they may be connected to the public network 10 via different base stations 12. The locations of both user equipments are determined in the public network and transmitted to the intermediary system 6. Location condition 8 specifies that user equipment 1 should be in either region A, D or G for access to be provided. In addition, the further location condition 24 indicate that the further user equipment 3 should be in region F or I for access for the user equipment 1 to the local device 2. Since both the location condition 8 and the further location condition 24 are satisfied, access will be provided for the user equipment 1.

Figure 14:
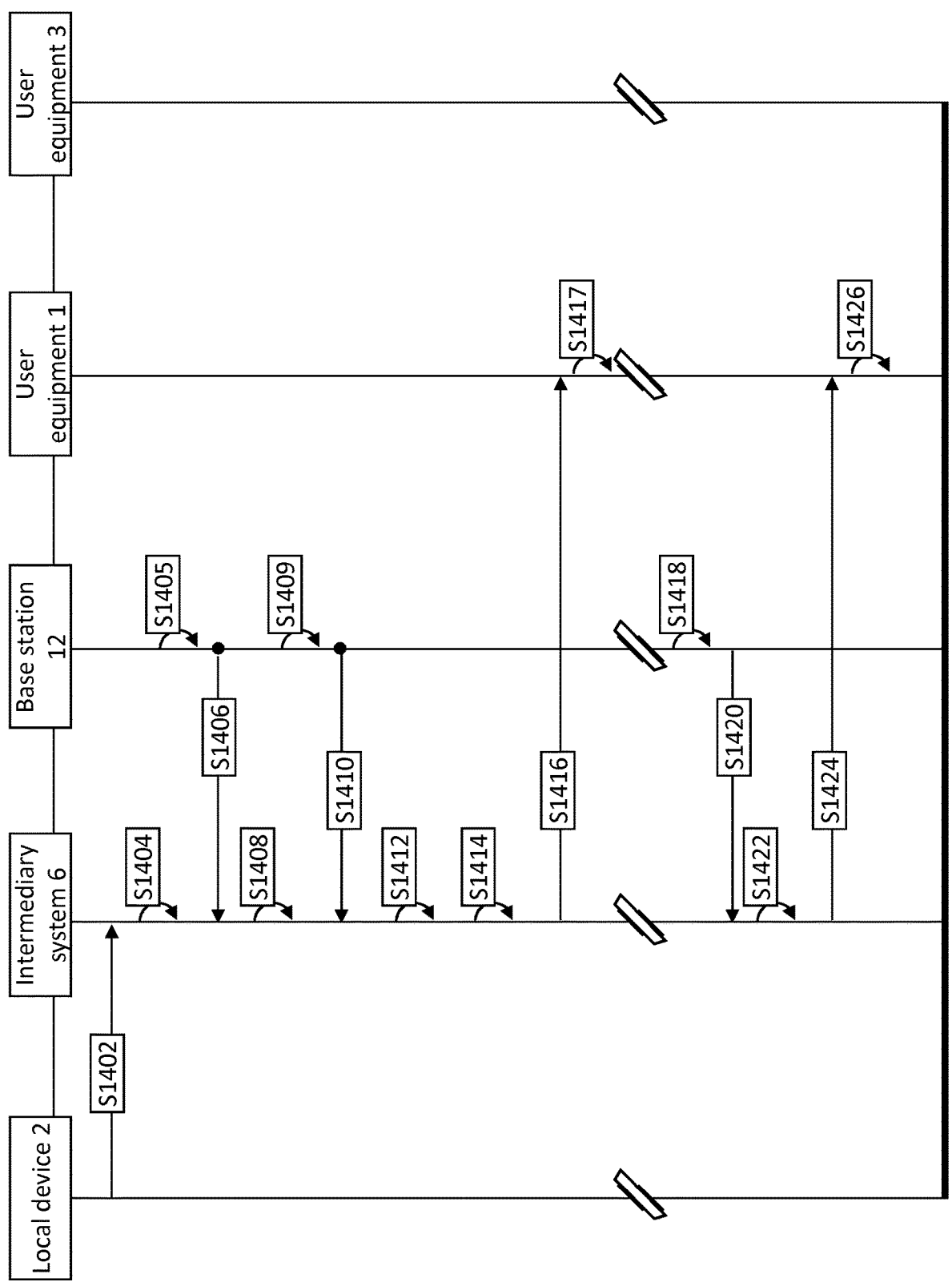

FIG. 14 is a time diagram illustrating how access for the user equipment 1 may be controlled in the situation of FIG. 13. First in step S1402 the intermediary system receives from local device 2 over the local network a device identifier and a state of the local device 2. In step S1404 the intermediary system 6 stores these. Step S1405 depicts that the location of user equipment 3 is determined in the public network. Similarly, step S1409 depicts that the location of user equipment 1 is determined in the public network. It should be appreciated that these locations need not be determined necessarily by the same base station. Each location may be determined in the public network at different locations. Alternatively (not shown), each user equipment determines its own location. In step S1406 the intermediary system 6 receives over the public network 10 the determined location of user equipment 3. In step S1408 the intermediary system stores this location. In step S1410, the intermediary system 6 receives over the public network 10 an indication of the location of user equipment 1. In step S1412, the intermediary system 6 stores this location of user equipment 1. In step S1414 the intermediary system 6 verifies whether the location condition 8 is satisfied by the received location of the user equipment 1 and whether the further location condition 24 is satisfied by the received location of the user equipment 3. As explained above, both conditions 8 and 24 are satisfied, after which the intermediary system 6 transmits in step S1416 the stored device identifier and the state of local device 2 to the user equipment 1. The transmitted device identifier and the state enable the user equipment 1 to present in step S1417 a virtual representation of local device 2 in the local network 4.

After some time, user equipment 3 has moved from region I to region B, which means that the further location condition 24 is no longer satisfied and that access to the local device 2 for the user equipment 1 must be denied. To illustrate this process the time diagram of FIG. 14 continues with step S1418, wherein the location of user equipment 3 is again determined in the public network 10. Subsequently the intermediary system 6 receives in step S1420 this updated location information indicating that the user equipment 3 is now in region I. In step S1422 the intermediary system 6 verifies whether the further location condition 24 is satisfied, which is not the case as explained above. Hence the intermediary system 6 denies access for the user equipment 1 and transmits in step S1424 to the user equipment 1 a message that access to the local device 2 has been denied. The action of denying access for user equipment 1 to local device 2 may be performed by blocking network traffic between user equipment 1 and local device 2. In step S1424 the intermediary system 6 may transmit an instruction for the user equipment 1 to no longer present the virtual representation that was generated in step S1417, after which in step S1426 the user equipment stops presenting the virtual representation of local device 2. In a further example the virtual representation is comprised in a virtual view generated in a mobile phone. The virtual view comprises all local devices that are connected to the local network 4 and to which the user equipment 1 has access and may be presented to the user on a display. Hence the user may be able to see the current state of a number of local devices. Based on the instruction sent in step S1424 the user equipment may remove the virtual representation of the local device 2 from the virtual view. The user then no longer sees local device 2 in the virtual view.

It may also be that in step S1424 an update is transmitted that enables the user equipment in step S1426 to present an updated virtual representation comprising an indication that access for the user equipment to local device has been denied. In the further example above, step S1426 may comprise greying out the virtual representation of local device 2 in the virtual view, so that the user knows that the user equipment 1 no longer has access to local device 2.

Figure 15:
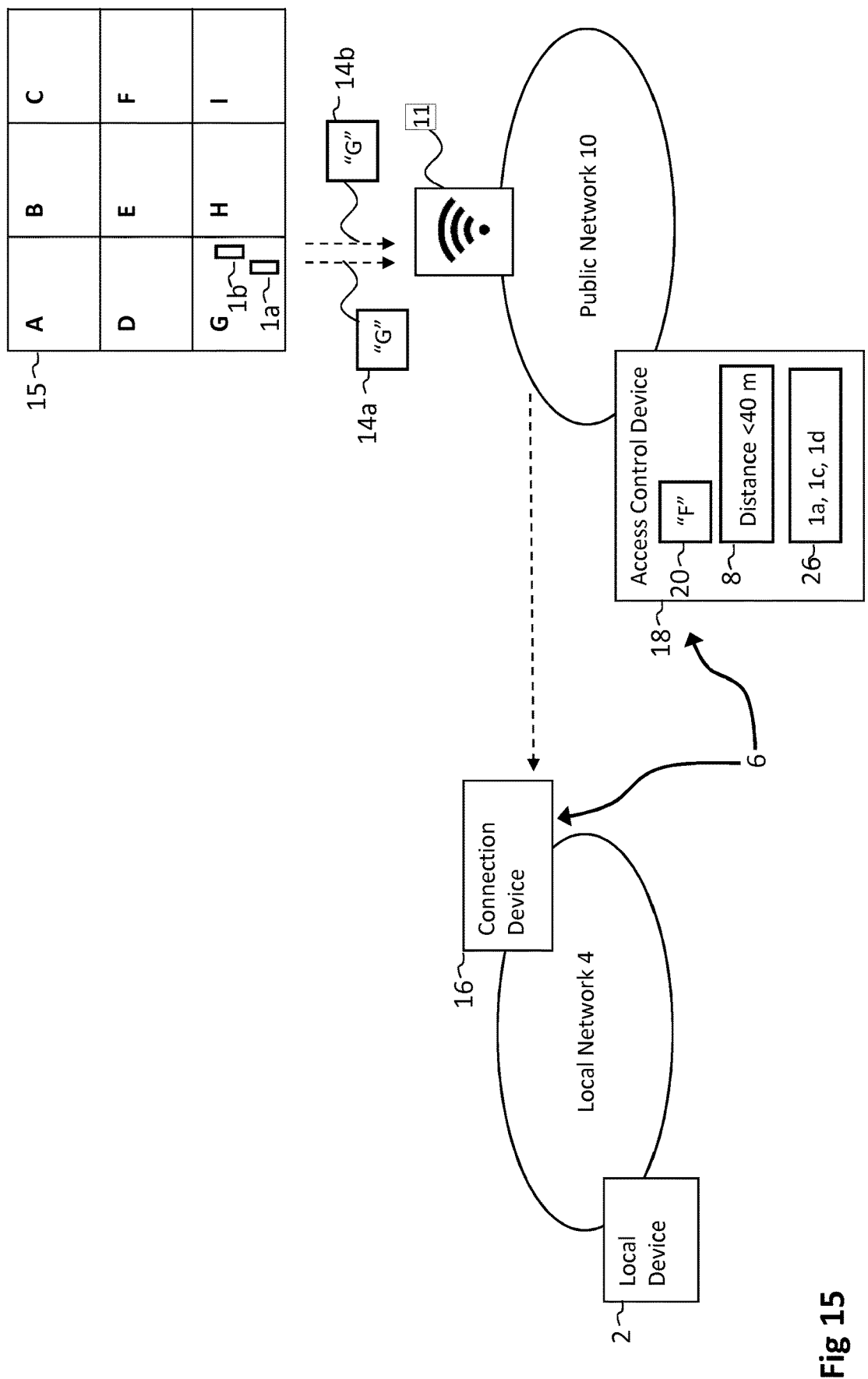

FIG. 15 shows another situation wherein an embodiment of the invention is implemented. The access control device 18 sits in the public network 10. Note that two user equipment are shown, 1a and 1b, both present in geographical region G. Both user equipments are configured to determine their own location and are connected to the public network 10 via a WiFi access point 11. The access control device 18 has stored the location of the connection device 16, "F", location condition 8, being that a user equipment should be within 40 meters from the connection device 16, and access condition 26. Note that the location condition 8 applies both to user equipment 1b and to user equipment 1a. Also note that the access condition 26 comprises a list of user equipments, namely, 1a, 1c and 1d. The access condition 26 specifies that access for a user equipment may only be provided if the user equipment is on this list. Hence, access for user equipment 1b will not be provided. Since user equipment 1a is on the list, access for user equipment 1a will be provided if the location condition 8 is also satisfied.

Figure 16:
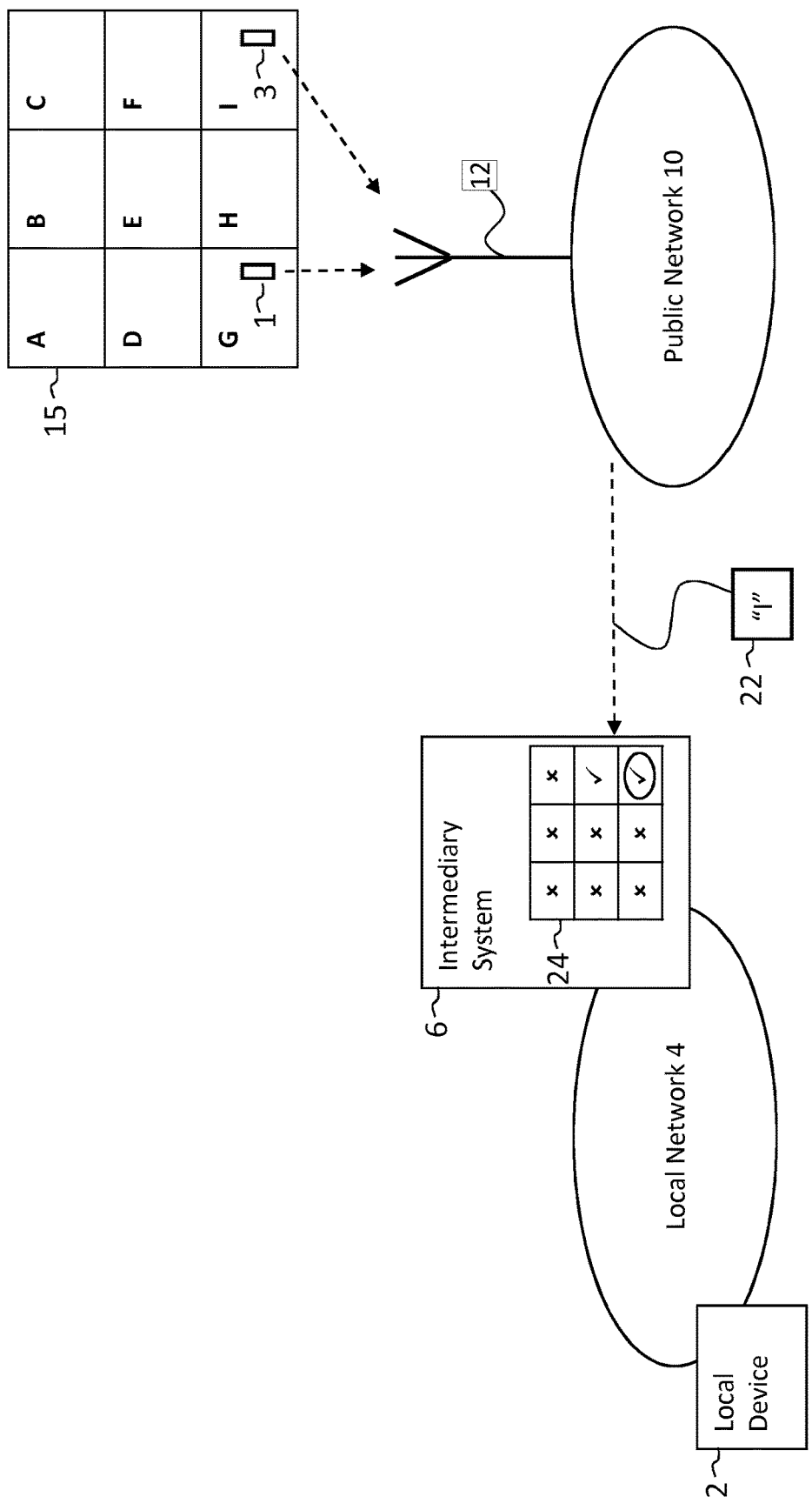

FIG. 16 shows yet another situation wherein an embodiment of the invention is implemented. Herein the intermediary system 6 has stored further location condition 24 that relates to the further user equipment 3. In this situation, no location condition 8 relating to user equipment 1 is stored in the intermediary system. Hence, in this situation, only further location condition 24 needs to be satisfied by the location information 22, which is indeed the case. The location of user equipment 1 is not relevant for controlling the access for user equipment 1 to the local device 2, only the location of user equipment 3 is relevant.

Figure 17:
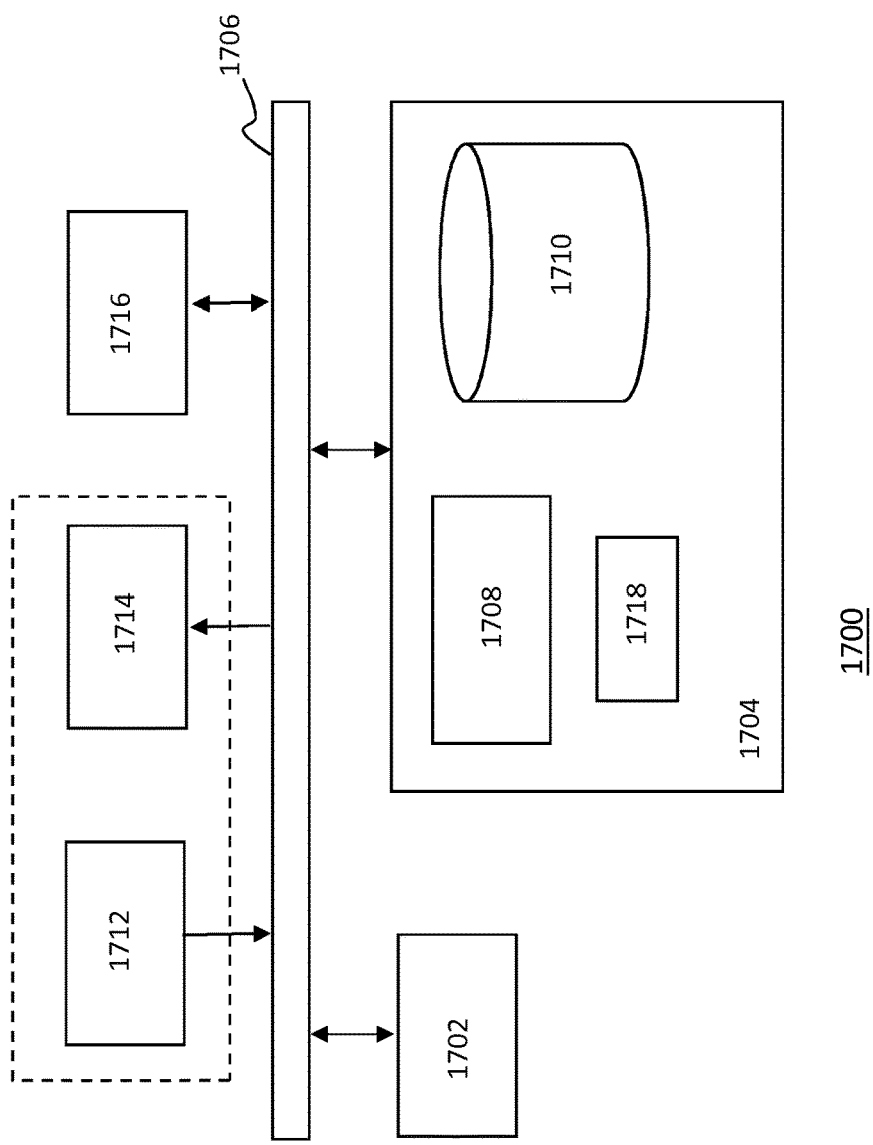
FIG. 17 depicts a computing system that may be used in embodiments of the invention.

FIG. 17 depicts a block diagram illustrating an exemplary data processing system that may be used in one of the disclosed methods and/or comprised in the intermediary system.

As shown in FIG. 17, the data processing system 1700 may include at least one processor 1702 coupled to memory elements 1704 through a system bus 1706. As such, the data processing system may store program code within memory elements 1704. Further, the processor 1702 may execute the program code accessed from the memory elements 1704 via a system bus 1706. In one aspect, the data processing system may be implemented as a computer that is suitable for storing and/or executing program code. It should be appreciated, however, that the data processing system 1700 may be implemented in the form of any system including a processor and a n,"ry that is capable of performing the functions described within this specification.

The memory elements 1704 may include one or more physical memory devices such as, for example, local memory 1708 and one or more bulk storage devices 1710. The local memory may refer to random access memory or other non-persistent memory device(s) generally used during actual execution of the program code. A bulk storage device may be implemented as a hard drive or other persistent data storage device. The processing system 1700 may also include one or more cache memories (not shown) that provide temporary storage of at least some program code in order to reduce the number of times program code must be retrieved from the bulk storage device 1710 during execution.

Input/output (I/O) devices depicted as an input device 1712 and an output device 1714 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 17 with a dashed line surrounding the input device 1712 and the output device 1714). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1716 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1700, and a data transmitter for transmitting data from the data processing system 1700 to said systems, devices and/or networks. Modems, cable modems, and Ethernet cards are examples of different types of network adapter that may be used with the data processing system 1700.

As pictured in FIG. 17, the memory elements 1704 may store an application 1718. In various embodiments, the application 1718 may be stored in the local memory 1708, the one or more bulk storage devices 1710, or apart from the local memory and the bulk storage devices. It should be appreciated that the data processing system 1700 may further execute an operating system (not shown in FIG. 17) that can facilitate execution of the application 1718. The application 1718, being implemented in the form of executable program code, can be executed by the data processing system 1700, e.g., by the processor 1702. Responsive to executing the application, the data processing system 1700 may be configured to perform one or more operations or method steps described herein.

In one aspect of the present invention, the data processing system 1700 may represent an intermediary system, storage means, connection device or access control device as described herein.

In another aspect, the data processing system 1700 may represent a client data processing system. In that case, the application 1718 may represent a client application that, when executed, configures the data processing system 1700 to perform the various functions described herein with reference to a "client". Examples of a client can include, but are not limited to, a personal computer, a portable computer, a mobile phone, or the like.

In yet another aspect, the data processing system 1700 may represent a server. For example, the data processing system may represent an (HTTP) server, in which case the application 1718, when executed, may configure the data processing system to perform (HTTP) server operations.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or harddisk drive or any type of solid-state random-access semiconductor memory) on which alterable information is stored. The computer program may be run on the processor 1702 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method for controlling access for a user equipment to at least one local device via an intermediary system that comprises a connection device configured to connect to a local network and to a public network, and an access control device in the public network, wherein the user equipment is connected to the public network and the at least one local device is connected to the local network, the method comprising:

storing one or more location conditions for access for the user equipment to the at least one local device using the connection device, wherein the one or more location conditions comprise a proximity condition relating to the intermediary system, and wherein the proximity condition comprises a condition that the user equipment is within a certain distance from the connection device;
receiving by the access control device first location information of the user equipment over the public network, the first location information comprising geographical coordinates indicating a location of the user equipment using the intermediary system;
storing second location information comprising geographical coordinates indicating a location of the connection device in the access control device;
determining by the access control device a distance between the connection device and the user equipment based on the first and second location information;
controlling access for the user equipment to the at least one local device using the connection device by verifying whether the determined distance satisfies the proximity condition;
receiving at the connection device via the public network from the user equipment a control signal for the at least one local device;
after the access control device has provided access for the user equipment to the at least one local device, transmitting via the local network the control signal to the at least one local device from the connection device;
receiving at least one of updated first location information or updated second location information; and
denying access for the user equipment to the at least one local device in dependence of the proximity condition no longer being satisfied based on an updated distance, the updated distance being determined based on at least one of the updated first location information or the updated second location information.

2. The method according to claim 1, wherein the at least one local device comprises a first local device and a second local device, wherein the one or more location conditions comprise a first location condition for access for the user equipment to the first local device and a second condition for access for the user equipment to the second local device, the method further comprising:
controlling access for the user equipment to the first local device by verifying whether the first location information satisfies the first location condition; and
controlling access for the user equipment to the second local device by verifying whether the first location information satisfies the second location condition.

3. The method according to claim 1, further comprising:
storing one or more further location conditions for access for the user equipment to the at least one local device, the one or more further location conditions relating to a further user equipment;
receiving third location information indicating a location of the further user equipment; and
controlling access for the user equipment to the at least one local device by verifying whether the third location information satisfies the one or more further location conditions.

4. The method according to claim 3, further comprising:
receiving updated third location information; and
denying access for the user equipment to the at least one local device in dependence of
the one or more further location conditions no longer being satisfied based on the updated third location information.

5. The method according to claim 1, further comprising:
storing one or more access conditions for access for the user equipment to the at least one local device, the one or more access conditions relating to at least one of:
a list of identifiers associated with a plurality of user equipment, the list being stored in the intermediary system, or
a point in time or time period; and
controlling access for the user equipment to the at least one local device in dependence of whether the one or more access conditions are satisfied.

6. An intermediary system for controlling access for a user equipment to at least one local device via the intermediary system, wherein the user equipment is connected to a public network and the at least one local device is connected to a local network, the intermediary system comprising:
a connection device that is configured to connect to the local network and to the public network;
an access control device in the public network configured to receive first location information of the user equipment over the public network, the first location information comprising geographical coordinates indicating a location of the user equipment;
storage means configured to store second location information comprising geographical coordinates indicating a location of the connection device, and one or more location conditions for access for the user equipment to the at least one local device, wherein the one or more location conditions comprise a proximity condition relating to the intermediary system, and wherein the proximity condition comprises a condition that the user equipment is within a certain distance from the connection device; and
memory storing instructions that, when executed by one or more processors of the intermediary system, cause the access control device to determine a distance between the connection device and the user equipment based on the first and second location information,
wherein the access control device in the public network is further configured to control access for the user equipment to the at least one local device by verifying whether the determined distance satisfies the proximity condition,
wherein the connection device is further configured to:
receive via the public network from the user equipment a control signal for the at least one local device; and
after the access control device has provided access for the user equipment to the at least one local device, transmit via the local network the control signal to the at least one local device,
and wherein the intermediary system is configured to:
receive at least one of updated first location information or updated second location information; and
deny access for the user equipment to the at least one local device in dependence of the proximity condition no longer being satisfied based on an updated distance, the updated distance being determined based on at least one of the updated first location information or the updated second location information.

7. The intermediary system according to claim 6, wherein the at least one local device comprises a first local device and a second local device;
wherein the storage means are further configured to store a first device identifier associated with the first local device and to store a second device identifier associated with the second local device;

wherein the one or more location conditions comprise a first location condition associated with the first device identifier for access for the user equipment to the first local device and a second location condition associated with the second device identifier for access for the user equipment to the second local device; and wherein the access control device is further configured to control access for the user equipment to the first local device by verifying whether the first location information satisfies the first location condition and to control access for the user equipment to the second local device by verifying whether the first location information satisfies the second location condition.

8. The intermediary system according to claim 6, wherein the storage means are further configured to store one or more further location conditions for access for the user equipment to the at least one local device, the one or more further location conditions relating to further user equipment;

wherein the connection device is further configured to receive third location information indicating a location of the further user equipment; and wherein the access control device is further configured to control access for the user equipment to the at least one local device by verifying whether the third location information satisfies the one or more further location conditions.

9. The intermediary system according to claim 8, wherein the connection device is further configured to receive updated third location information; and wherein the access control device is further configured to deny access for the user equipment to the at least one local device in dependence of
the one or more further location conditions no longer being satisfied based on the updated third location information.

10. The intermediary system according to claim 6, wherein the storage means are further configured to store one or more access conditions for access for the user equipment to the at least one local device, the one or more access conditions relating to at least one of:
a list of identifiers associated with a plurality of user equipment, the list being stored in the intermediary system, and
a point in time or time period; and
wherein the access control device is further configured to control access for the user equipment to the at least one local device in dependence of whether the one or more access conditions are satisfied.

11. A non-transitory computer readable medium having stored thereon at least one software code portion for controlling access for a user equipment to at least one local device via an intermediary system that comprises a connection device configured to connect to a local network and to a public network, and an access control device in the public network, wherein the user equipment is connected to the public network and the at least one local device is connected to the local network, wherein the at least one software code portion comprises instructions that, when executed on a computer system, causes the computer system to carry out operations including:
storing one or more location conditions for access for the user equipment to the at least one local device using the connection device, wherein the one or more location conditions comprise a proximity condition relating to the intermediary system, and wherein the proximity condition comprises a condition that the user equipment is within a certain distance from the connection device;

receiving by the access control device first location information of the user equipment over the public network, the first location information comprising geographical coordinates indicating a location of the user equipment using the intermediary system;

storing second location information comprising geographical coordinates indicating a location of the connection device in the access control device;

determining by the access control device a distance between the connection device and the user equipment based on the first and second location information;

controlling access for the user equipment to the at least one local device using the connection device by verifying whether the determined distance satisfies the proximity condition receiving at the connection device via the public network from the user equipment a control signal for the at least one local device;

after the access control device has provided access for the user equipment to the at least one local device, transmitting via the local network the control signal to the at least one local device from the connection device;

receiving at least one of updated first location information or updated second location information; and denying access for the user equipment to the at least one local device in dependence of the proximity condition no longer being satisfied based on an updated distance, the updated distance being determined based on at least one of the updated first location information or the updated second location information.

12. The method according to claim 1, further comprising;
after denying access for the user equipment to the at least one local device, at least one of:
transmitting an instruction for the user equipment to disable display of a virtual representation of the at least one local device in the local network; and
transmitting an update for the user equipment enabling the user equipment to display an updated virtual representation of the at least one local device in the local network, wherein the updated virtual representation comprises an indication that access for the user equipment to the at least one local device has been denied.

13. The intermediary system according claim 6, wherein the connection device is further configured to, after the access control device has denied access for the user equipment to the at least one local device, at least one of:
transmit an instruction for the user equipment to disable display of a virtual representation of the at least one local device in the local network; and
transmit an update for the user equipment enabling the user equipment to display an updated virtual representation of the at least one local device in the local network, wherein the updated virtual representation comprises an indication that access for the user equipment to the at least one local device has been denied.

* * * * *